United States Patent
Shimauchi

(10) Patent No.: US 10,212,361 B2
(45) Date of Patent: Feb. 19, 2019

(54) INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventor: Kazuhiro Shimauchi, Tokyo (JP)

(73) Assignee: SONY CORPORATION, Tokyo (JP)

(*) Notice: Subject to any disclaimer, the term of this patent is extended or adjusted under 35 U.S.C. 154(b) by 263 days.

(21) Appl. No.: 14/891,440

(22) PCT Filed: Jun. 16, 2014

(86) PCT No.: PCT/JP2014/065855
§ 371 (c)(1),
(2) Date: Nov. 16, 2015

(87) PCT Pub. No.: WO2014/208378
PCT Pub. Date: Dec. 31, 2014

(65) Prior Publication Data
US 2016/0105618 A1    Apr. 14, 2016

(30) Foreign Application Priority Data
Jun. 28, 2013 (JP) ................. 2013-136219

(51) Int. Cl.
*H04N 5/247* (2006.01)
*H04N 7/18* (2006.01)
(Continued)

(52) U.S. Cl.
CPC .............. *H04N 5/247* (2013.01); *H04N 5/77* (2013.01); *H04N 5/772* (2013.01); *H04N 5/91* (2013.01); *H04N 7/181* (2013.01); *H04N 9/806* (2013.01)

(58) Field of Classification Search
CPC .......... H04N 5/247; H04N 5/77; H04N 5/772; H04N 5/91; H04N 7/181; H04N 9/806
See application file for complete search history.

(56) References Cited

U.S. PATENT DOCUMENTS

2007/0201815 A1* 8/2007 Griffin ................. G11B 27/034
386/231
2009/0304348 A1* 12/2009 Hio ....................... G11B 27/322
386/223
(Continued)

FOREIGN PATENT DOCUMENTS

JP          08-070401 A    3/1996
JP          2001-036867 A  2/2001
(Continued)

*Primary Examiner* — Hung Q Dang
*Assistant Examiner* — Sunghyoun Park
(74) *Attorney, Agent, or Firm* — Chip Law Group

(57) ABSTRACT

The present technology relates to an information processing device, an information processing method, a program, and an information processing system that make it possible to synchronize recording of time-series data acquired by a plurality of information processing devices. An information processing terminal includes a reception control unit configured to control reception of first time-series data acquired by a plurality of cameras and acquisition times of the first time-series data based on local time, which is time in each of the cameras, and a synchronization control unit configured to determine, on the basis of the first time-series data from the plurality of cameras, start timing or end timing of recording of second time-series data acquired by the plurality of cameras. The present technology can be applied to, for example, a shooting system that performs shooting with a plurality of cameras.

11 Claims, 18 Drawing Sheets

(51) Int. Cl.
*H04N 5/77* (2006.01)
*H04N 5/91* (2006.01)
*H04N 9/806* (2006.01)

(56) References Cited

U.S. PATENT DOCUMENTS

| | | | | |
|---|---|---|---|---|
| 2011/0267269 | A1* | 11/2011 | Tardif | G06F 3/011 345/158 |
| 2013/0015975 | A1* | 1/2013 | Huennekens | G06Q 50/22 340/573.1 |
| 2013/0293709 | A1* | 11/2013 | Cha | H04N 9/79 348/143 |
| 2014/0375493 | A1* | 12/2014 | Weisenburger | G01S 19/48 342/357.3 |
| 2015/0185054 | A1* | 7/2015 | Hesch | G01D 9/005 702/187 |
| 2015/0213838 | A1* | 7/2015 | Dinev | G11B 27/105 386/224 |
| 2016/0037082 | A1* | 2/2016 | Wang | A61B 1/00009 348/65 |

FOREIGN PATENT DOCUMENTS

| | | | |
|---|---|---|---|
| JP | 2003-078864 A | 3/2003 | |
| JP | 4186520 B1 | 11/2008 | |

\* cited by examiner

INFORMATION PROCESSING DEVICE, INFORMATION PROCESSING METHOD, AND INFORMATION PROCESSING SYSTEM

TECHNICAL FIELD

The present technology relates to an information processing device, an information processing method, a program, and an information processing system. The present technology particularly relates to an information processing device, an information processing method, a program, and an information processing system that are suitable for use in the case of synchronizing recording of time-series data acquired by a plurality of information processing devices.

BACKGROUND ART

Achieving, when a plurality of cameras perform shooting in collaboration, synchronization of the start and the end of shooting between the plurality of cameras by inputting a synchronization signal to each camera from a synchronization signal generator has been conventionally proposed (e.g., see Patent Literature 1).

CITATION LIST

Patent Literature

Patent Literature 1: JP 4186520B

SUMMARY OF INVENTION

Technical Problem

Unfortunately, the method described in Patent Literature 1 needs a synchronization signal generator and a client PC, in addition to a camera and a server PC, which increases the trouble of installation and necessary cost. In addition, since a synchronization signal needs to be input to each camera without delay, it is difficult to use a communication means such as wireless communication, in which great delay occurs in signaling.

The present technology facilitates synchronization of recording of data obtained by shooting with a plurality of cameras.

Solution to Problem

According to a first aspect of the present technology, there is provided an information processing device including: a reception control unit configured to control reception of first time-series data acquired by a plurality of other information processing devices and acquisition times of the first time-series data based on local time, which is time in each of the other information processing devices; and a synchronization control unit configured to determine, on the basis of the first time-series data from the plurality of other information processing devices, start timing or end timing of recording of second time-series data acquired by the plurality of other information processing devices.

The synchronization control unit can determine, on the basis of the first time-series data from the plurality of other information processing devices, the start timing or the end timing based on the local time for each of the other information processing devices, and report the start timing or the end timing to each of the other information processing devices.

A command unit configured to command the plurality of other information processing devices to start and end acquisition of the second time-series data can be further included.

The synchronization control unit can determine a latest time among times at which the plurality of other information processing devices have started acquisition of the first time-series data or a time later than the latest time, as the start timing.

The reception control unit can control reception of end times of acquisition of the second time-series data based on the local time of each of the other information processing devices. The synchronization control unit can determine an earliest time among the end times of the plurality of other information processing devices or a time earlier than the earliest time, as the end timing.

A correspondence detection unit configured to detect a difference in the local time of each of the other information processing devices by synchronizing the first time-series data from the plurality of other information processing devices can be further included. The synchronization control unit can determine the start timing or the end timing on the basis of the detected difference in the local time of each of the other information processing devices.

The reception control unit can control reception of the first time-series data and the acquisition times of the first time-series data transmitted from the plurality of other information processing devices at a predetermined interval. The correspondence detection unit can perform synchronization processing of the first time-series data in parallel with reception of the first time-series data performed every predetermined interval.

A type of the first time-series data and a type of the second time-series data can coincide at least partly.

The first time-series data can include video data, audio data, or data of a sensor provided in the other information processing device, and the second time-series data can include video data or audio data.

According to the first aspect of the present technology, there is provided an information processing method including: a reception control step of controlling reception of first time-series data acquired by a plurality of other information processing devices and acquisition times of the first time-series data based on local time, which is time in each of the other information processing devices, through an information processing device; and a synchronization control step of determining, on the basis of the first time-series data from the plurality of other information processing devices, start timing or end timing of recording of second time-series data acquired by the plurality of other information processing devices through the information processing device.

According to the first aspect of the present technology, there is provided a program for causing a computer of an information processing device to execute processing including: a reception control step of controlling reception of first time-series data acquired by a plurality of other information processing devices and acquisition times of the first time-series data based on local time, which is time in each of the other information processing devices; and a synchronization control step of determining, on the basis of the first time-series data from the plurality of other information processing devices, start timing or end timing of recording of second time-series data acquired by the plurality of other information processing devices.

According to a second aspect of the present technology, there is provided an information processing device including: an acquisition control unit configured to control acquisition of first time-series data and second time-series data; a reception control unit configured to control reception of the first time-series data acquired by one or more other information processing devices and acquisition times of the first time-series data based on local time, which is time in the other information processing devices; and a synchronization control unit configured to determine, on the basis of the first time-series data acquired by control through the acquisition control unit and the first time-series data from the other information processing devices, start timing or end timing of recording of the second time-series data acquired by control through the acquisition control unit and the second time-series data acquired by the other information processing devices.

According to a third aspect of the present technology, there is provided an information processing device including: an acquisition control unit configured to control acquisition of first time-series data and second time-series data; a transmission control unit configured to control transmission of the first time-series data and an acquisition time of the first time-series data based on local time, which is time in a device, to a first other information processing device; a reception control unit configured to receive start timing, which is synchronized with timing at which recording of the second time-series data acquired by one or more second other information processing devices is started and is based on the local time, or end timing, which is synchronized with timing at which recording of the second time-series data acquired by the second other information processing devices is ended and is based on the local time, from the first other information processing device; and a recording control unit configured to control start or end of recording of the second time-series data on the basis of the received start timing or end timing.

The reception control unit can control reception of a command to start acquisition of the second time-series data from the first other information processing device. The acquisition control unit can perform control in a manner that acquisition of the second time-series data is started in accordance with the command from the first other information processing device. The recording control unit can perform control in a manner that recording of the second time-series data is started together with the start of acquisition of the second time-series data and, when the start timing has been received from the first information processing device, the start timing is recorded in association with the second time-series data.

The reception control unit can control reception of a command to start acquisition of the second time-series data from the first other information processing device. The acquisition control unit can perform control in a manner that acquisition of the second time-series data is started in accordance with the command from the first other information processing device. The recording control unit can perform control in a manner that recording of the second time-series data is started together with the start of acquisition of the second time-series data and, when the start timing has been received from the first information processing device, the second time-series data before the start timing is erased.

The recording control unit can perform control in a manner that, when the end timing has been received from the first information processing device, the end timing is recorded in association with the second time-series data.

The recording control unit can perform control in a manner that, when the end timing has been received from the first information processing device, the second time-series data after the end timing is erased.

The reception control unit can control reception of a command to end acquisition of the second time-series data from the first other information processing device. The acquisition control unit can perform control in a manner that acquisition of the second time-series data is ended in accordance with the command from the first other information processing device. The transmission control unit can control transmission of an end time of acquisition of the second time-series data based on the local time to the first other information processing device.

The transmission control unit can perform control in a manner that the first time-series data and the acquisition time of the first time-series data are transmitted at a predetermined interval.

The first other information processing device can be included in the second other information processing device.

A type of the first time-series data and a type of the second time-series data can coincide at least partly.

The first time-series data can include video data, audio data, or data of a sensor provided in the other information processing device, and the second time-series data can include video data or audio data.

According to the third aspect of the present technology, there is provided an information processing method including: an acquisition control step of controlling acquisition of first time-series data and second time-series data through an information processing device; a transmission control step of controlling transmission of the first time-series data and an acquisition time of the first time-series data based on local time, which is time in a device, to a first other information processing device through the information processing device; a reception control step of receiving start timing, which is synchronized with timing at which recording of the second time-series data acquired by one or more second other information processing devices is started and is based on the local time, or end timing, which is synchronized with timing at which recording of the second time-series data acquired by the second other information processing devices is ended and is based on the local time, from the first other information processing device through the information processing device; and a recording control step of controlling start or end of recording of the second time-series data on the basis of the received start timing or end timing through the information processing device.

According to the third aspect of the present technology, there is provided a program for causing a computer of an information processing device to execute processing including: an acquisition control step of controlling acquisition of first time-series data and second time-series data; a transmission control step of controlling transmission of the first time-series data and an acquisition time of the first time-series data based on local time, which is time in a device, to a first other information processing device; a reception control step of receiving start timing, which is synchronized with timing at which recording of the second time-series data acquired by one or more second other information processing devices is started and is based on the local time, or end timing, which is synchronized with timing at which recording of the second time-series data acquired by the second other information processing devices is ended and is based on the local time, from the first other information processing device; and a recording control step of controlling start or end of recording of the second time-series data on the basis of the received start timing or end timing.

According to a fourth aspect of the present technology, there is provided an information processing system including: a first information processing device; and a plurality of second information processing devices. The first information processing device includes a reception control unit configured to control reception of first time-series data acquired by the plurality of second information processing devices and acquisition times of the first time-series data based on local time, which is time in each of the second information processing devices, and a synchronization control unit configured to determine, on the basis of the first time-series data from the plurality of second information processing devices, start timing or end timing of recording of second time-series data acquired by the plurality of second information processing devices. Each of the second information processing devices includes an acquisition control unit configured to control acquisition of the first time-series data and the second time-series data, a transmission control unit configured to control transmission of the first time-series data and an acquisition time of the first time-series data based on the local time to the first information processing device, and a recording control unit configured to control start or end of recording of the second time-series data under the control of the synchronization control unit.

In the first aspect of the present technology, reception of first time-series data acquired by a plurality of other information processing devices and acquisition times of the first time-series data based on local time, which is time in each of the other information processing devices, is controlled, and, on the basis of the first time-series data from the plurality of other information processing devices, start timing or end timing of recording of second time-series data acquired by the plurality of other information processing devices is determined.

In the second aspect of the present technology, acquisition of first time-series data and second time-series data is controlled, reception of the first time-series data acquired by one or more other information processing devices and acquisition times of the first time-series data based on local time, which is time in the other information processing devices, is controlled, and, on the basis of the first time-series data acquired by control through the acquisition control unit and the first time-series data from the other information processing devices, start timing or end timing of recording of the second time-series data acquired by control through the acquisition control unit and the second time-series data acquired by the other information processing devices is determined.

In the third aspect of the present technology, acquisition of first time-series data and second time-series data is controlled, transmission of the first time-series data and an acquisition time of the first time-series data based on local time, which is time in the device, to a first other information processing device is controlled, start timing, which is synchronized with timing at which recording of the second time-series data acquired by one or more second other information processing devices is started and is based on the local time, or end timing, which is synchronized with timing at which recording of the second time-series data acquired by the second other information processing devices is ended and is based on the local time, is received from the first other information processing device, and start or end of recording of the second time-series data is controlled on the basis of the received start timing or end timing.

In the fourth aspect of the present technology, reception of first time-series data acquired by the plurality of second information processing devices and acquisition times of the first time-series data based on local time, which is time in each of the second information processing devices, is controlled, start timing or end timing of recording of second time-series data acquired by the plurality of second information processing devices is determined on the basis of the first time-series data from the plurality of second information processing devices, acquisition of the first time-series data and the second time-series data is controlled, transmission of the first time-series data and an acquisition time of the first time-series data based on the local time to the first information processing device is controlled, and start or end of recording of the second time-series data is controlled on the basis of the start timing or end timing.

Advantageous Effects of Invention

According to the first to fourth aspects of the present technology, recording of time-series data acquired by a plurality of information processing devices can be synchronized. For example, according to the first to fourth aspects of the present technology, recording of data obtained by shooting with a plurality of cameras can be synchronized.

DESCRIPTION OF EMBODIMENT(S)

Hereinafter, modes (hereinafter called embodiments) for carrying out the present technology will be described. The description is given in the following order.
1. Embodiments
2. Modification Examples

1. Embodiments

[Example Configuration of Shooting System 1]

Figure 1:
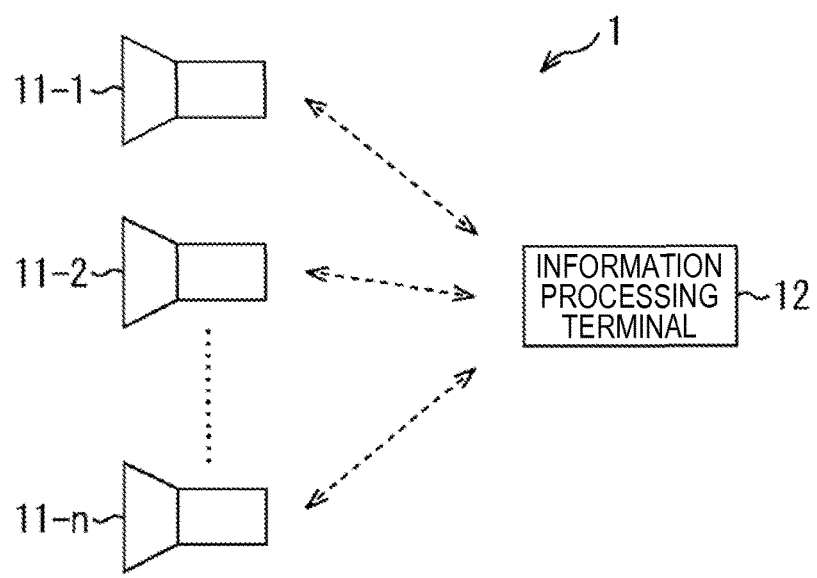
FIG. 1 is a block diagram illustrating a first embodiment of a shooting system to which the present technology is applied.

FIG. 1 is a block diagram illustrating an embodiment of a shooting system 1 to which the present technology is applied.

The shooting system 1 includes n cameras 11-1 to 11-$n$ and an information processing terminal 12. Hereinafter, when there is no need to distinguish between the individual cameras 11-1 to 11-$n$, they are simply called cameras 11.

The cameras 11 each have a communication function and can individually communicate with the information processing terminal 12. Note that any wireless or wired scheme can be adopted as a communication scheme between the cameras 11 and the information processing terminal 12. Furthermore, for example, it is not necessary to use a unified scheme as the communication scheme between the cameras 11 and the information processing terminal 12, and it is possible to adopt different communication schemes for different cameras 11.

The information processing terminal 12 is not limited to a specific device and is configured with, for example, a computer, a smartphone, a tablet, or the like.

[Example Configuration of Camera 11]

Figure 2:
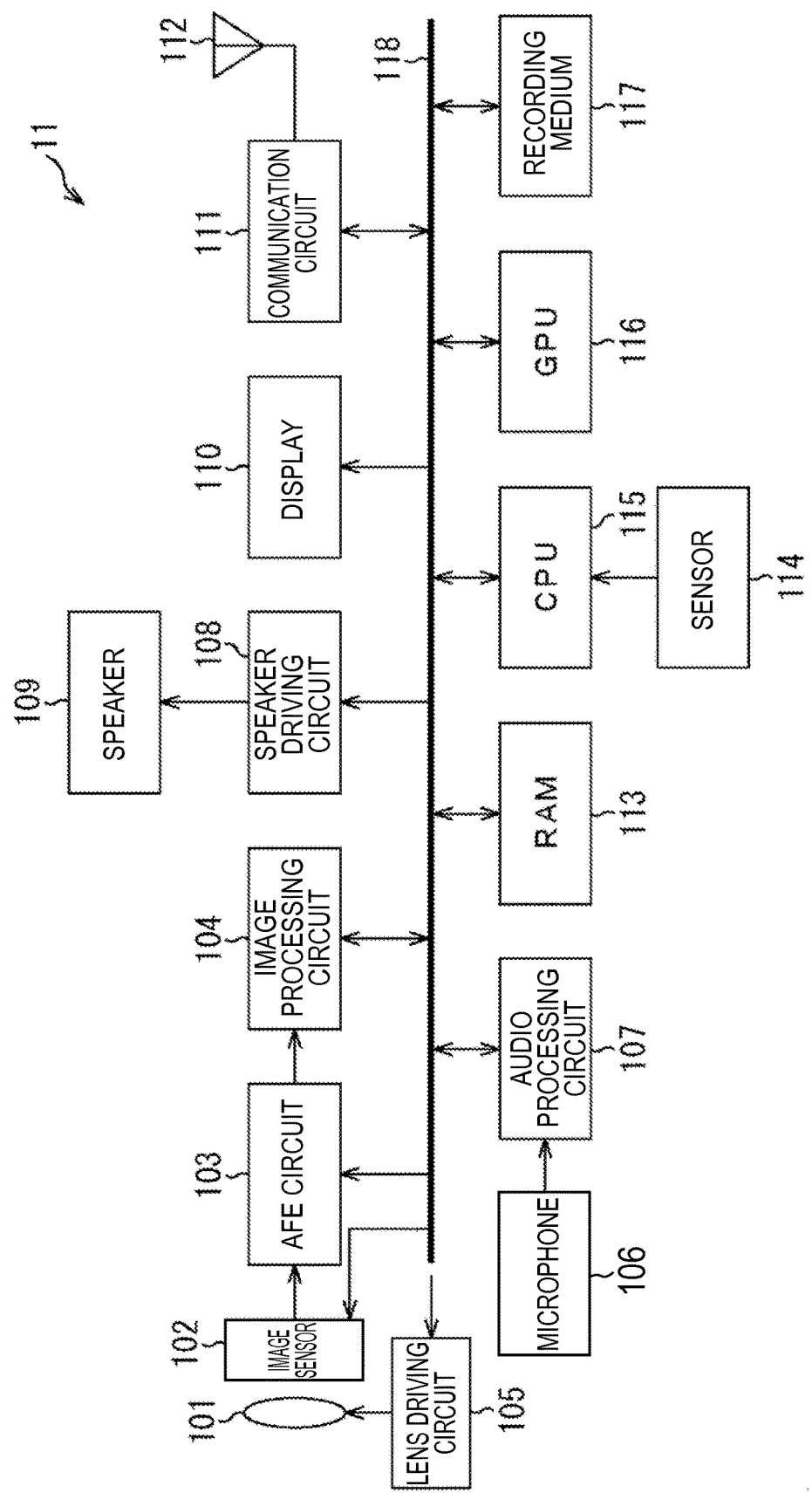
FIG. 2 is a block diagram illustrating an example configuration of a camera.

FIG. 2 is a block diagram illustrating an example configuration of the camera 11.

The camera 11 includes a lens 101, an image sensor 102, an analog front end (AFE) circuit 103, an image processing circuit 104, a lens driving circuit 105, a microphone 106, an audio processing circuit 107, a speaker driving circuit 108, a speaker 109, a display 110, a communication circuit 111, an antenna 112, a random access memory (RAM) 113, a sensor 114, a central processing unit (CPU) 115, a graphics processing unit (GPU) 116, a recording medium 117, and a bus 118. The image processing circuit 104, the lens driving circuit 105, the audio processing circuit 107, the speaker driving circuit 108, the display 110, the communication circuit 111, the RAM 113, the CPU 115, the GPU 116, and the recording medium 117 are mutually connected via the bus 118.

The image sensor 102 captures an image of light incident via the lens 101, and supplies the resulting video signal to the AFE circuit 103.

The AFE circuit 103 performs processing, such as correlated double sampling (CDS), auto gain control (AGC), and AD conversion, on the analog video signal supplied from the image sensor 102. The AFE circuit 103 supplies a digital video signal to the image processing circuit 104.

The image processing circuit 104 performs various types of image processing, such as white balance and gamma correction, on the video signal supplied from the AFE circuit 103 to generate video data in a predetermined format. The image processing circuit 104 supplies the generated video data to components of the camera 11 and records the data on the RAM 113 or the recording medium 117 via the bus 118.

The lens driving circuit 105 drives the lens 101 and performs adjustment of focal length or the like, under the control of the CPU 115.

The audio processing circuit 107 performs predetermined audio processing on audio collected by the microphone 106 to generate audio data. The audio processing circuit 107 supplies the generated audio data to components of the camera 11 and records the data on the RAM 113 or the recording medium 117 via the bus 118.

The speaker driving circuit 108 causes the speaker 109 to output audio based on the audio data generated by the audio processing circuit 107, for example.

The display 110 displays video based on the video data generated by the image processing circuit 104, for example.

The communication circuit 111 wirelessly communicates with the information processing terminal 12 via the antenna 112. Note that the scheme of wireless communication of the communication circuit 111 is not limited to a specific scheme, and any scheme, such as wireless fidelity (Wi-Fi), near field communication (NFC), or Bluetooth (registered trademark), can be adopted. The communication circuit 111 performs wireless communication in this example, but may perform wired communication.

Data or the like needed for processing of the CPU 115 or the GPU 116 is temporarily recorded on the RAM 113. In addition, video data from the image processing circuit 104 and audio data from the audio processing circuit 107 are temporarily recorded on the RAM 113.

The sensor 114 is configured with any one or more types of sensors. For example, the sensor 114 is configured with a gyro sensor, an acceleration sensor, a speed sensor, a position sensor, a displacement sensor, a pressure sensor, a temperature sensor, or the like. The sensor 114 supplies acquired sensor data to the CPU 115.

The CPU 115 controls the processing of components of the camera 11.

The GPU 116 mainly performs control of image processing, such as display of the display 110.

Video data from the image processing circuit 104, audio data from the audio processing circuit 107, and the like are recorded on the recording medium 117, for example. Note that the type of the recording medium 117 is not particularly limited and any type can be adopted.

The camera 11 has a clock function. Components of the camera 11 recognize local time, which is time in the device of the camera 11, by using the clock function.

Hereinafter, a time based on local time, in other words, a time expressed by local time, is called a local time. Accordingly, local time mainly expresses a time system defined by a clock function in each camera 11 or the information processing terminal 12, and a local time mainly expresses a time at a certain point in local time.

Figure 3:
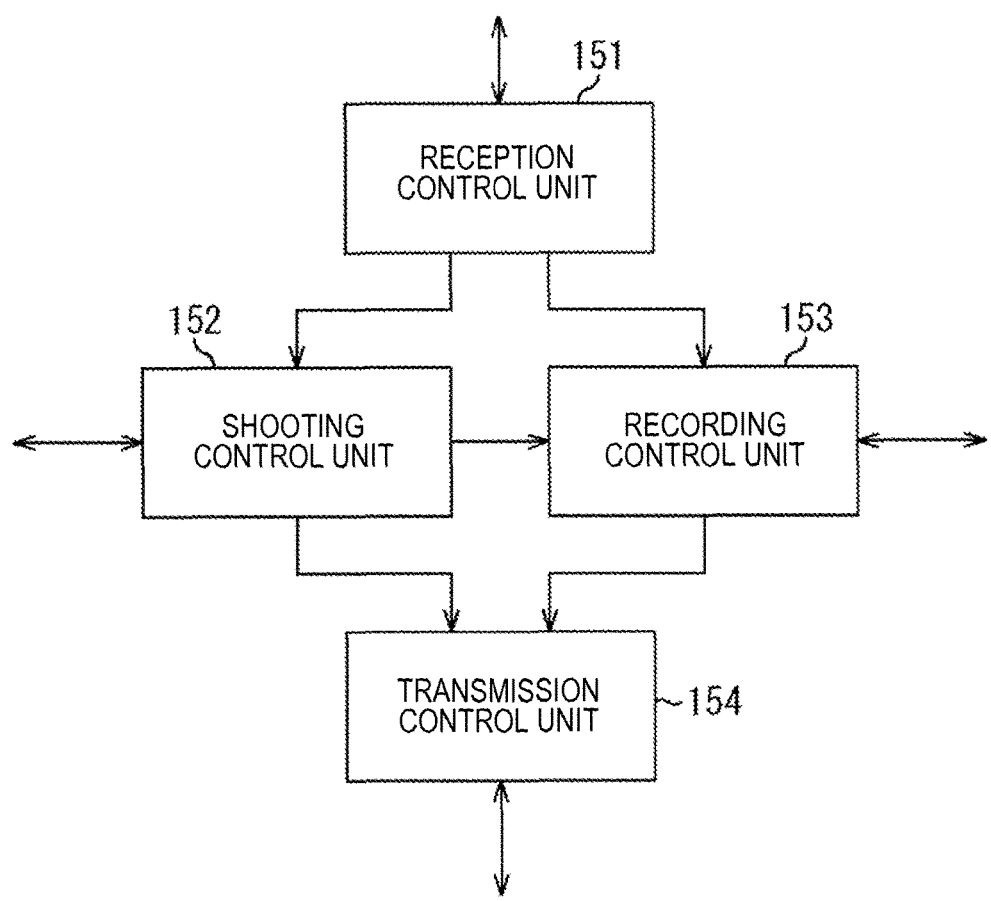
FIG. 3 is a block diagram illustrating an example configuration of functions implemented by a CPU or a GPU of a camera.

FIG. 3 is a block diagram illustrating an example configuration of part of functions implemented by the CPU 115 or the GPU 116 executing a predetermined control program. When the CPU 115 or the GPU 116 executes the predetermined control program, a reception control unit 151, a shooting control unit 152, a transmission control unit 154, and a recording control unit 153 are included.

The reception control unit 151 performs control of reception processing of the communication circuit 111. The reception control unit 151 supplies, as necessary, received data, signals, and the like to the shooting control unit 152, the recording control unit 153, or components of the camera 11.

The shooting control unit 152 controls the shooting element 102, the AFE circuit 103, the image processing circuit 104, the audio processing circuit 107, and the like to control shooting of the camera 11 and controls, for example, the start, end, and the like of the acquisition of video data and audio data. In addition, the shooting control unit 152 reports a state of shooting processing or the like to the recording control unit 153 and the transmission control unit 154.

The recording control unit 153 controls the image processing circuit 104, the audio processing circuit 107, and the like to control recording of video data and audio data onto the RAM 113 or the recording medium 117. In addition, the recording control unit 153 reports a state of recording processing or the like to the transmission control unit 154.

The transmission control unit 154 performs control of transmission processing of the communication circuit 111.

[Example Configuration of Information Processing Terminal 12]

Figure 4:
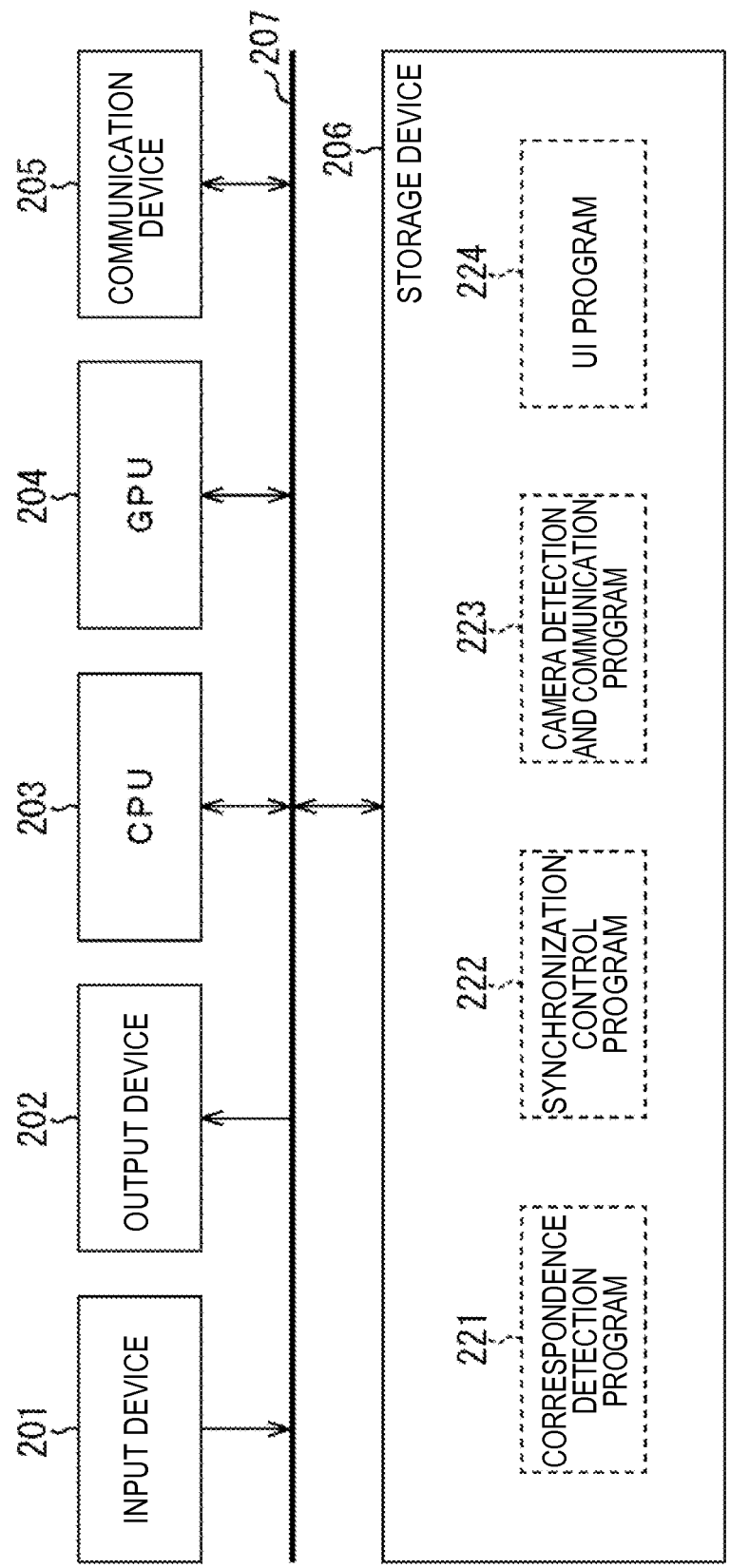
FIG. 4 is a block diagram illustrating an example configuration of an information processing terminal.

FIG. 4 is a block diagram illustrating an example configuration of the information processing terminal 12.

The information processing terminal 12 includes an input device 201, an output device 202, a CPU 203, a GPU 204, a communication device 205, a storage device 206, and a bus 207. The input device 201, the output device 202, the CPU 203, the GPU 204, the communication device 205, and the storage device 206 are mutually connected via the bus 207.

The input device 201 is a device for performing operation of the information processing terminal 12 and performing input of various commands, data, and the like. For example, the input device 201 is configured with a button, a switch, a key, a keyboard, a touch panel, a microphone, or the like.

The output device 202 is a device for performing output of video, an image, audio, various types of data, and the like. The output device 202 is configured with, for example, a display, a speaker, a video output circuit, an audio output circuit, or the like.

The CPU 203 controls the processing of components of the information processing terminal 12.

The GPU 204 mainly performs control of image processing of the information processing terminal 12.

The communication device 205 communicates with the communication circuit 111 of the camera 11 by a scheme corresponding to the communication circuit 111. In the case where the cameras 11 adopt different communication schemes, the communication device 205 is configured to correspond to each communication scheme.

The storage device 206 stores data or the like needed for processing of the information processing terminal 12. In addition, the storage device 206 stores a correspondence detection program 221, a synchronization control program 222, a camera detection and communication program 223, and a user interface (UI) program 224, which are programs for causing the CPU 203 or the GPU 204 to execute predetermined processing.

The correspondence detection program 221 is used mainly for detection processing of a correspondence of local time (hereinafter called local time correspondence) of the cameras 11.

The synchronization control program 222 is used mainly for synchronization control of recording of video data and audio data of the cameras 11.

The camera detection and communication program 223 is used mainly for detection of the camera 11 that is able to communicate and communication processing with the camera 11.

The UI program 224 is used for control of a user interface of the information processing terminal 12.

The information processing terminal 12 has a clock function. Components of the information processing terminal 12 recognize local time in the device of the information processing terminal 12 by using the clock function.

Figure 5:
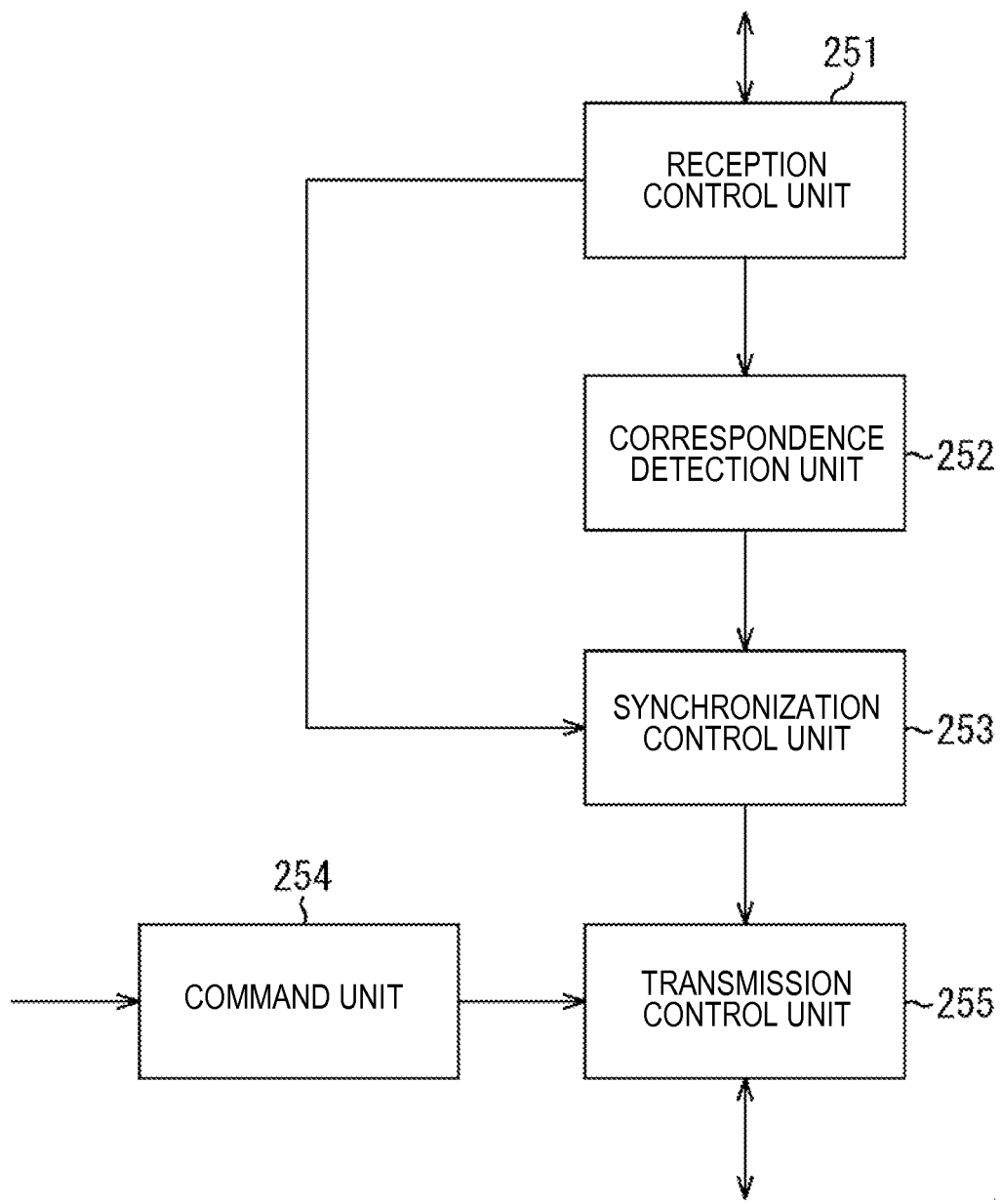
FIG. 5 is a block diagram illustrating an example configuration of functions implemented by a CPU or a GPU of an information processing terminal.

FIG. 5 is a block diagram illustrating part of an example configuration of functions implemented by the CPU 203 or the GPU 204 executing the correspondence detection program 221, the synchronization control program 222, the camera detection and communication program 223, and the UI program 224. When the CPU 203 or the GPU 204 executes these programs, functions including a reception control unit 251, a correspondence detection unit 252, a synchronization control unit 253, a command unit 254, and a transmission control unit 255 are implemented.

The reception control unit 251 performs control of reception processing of the communication device 205. The reception control unit 251 supplies, as necessary, received data, signals, and the like to the correspondence detection unit 252, the synchronization control unit 253, or components of the information processing terminal 12.

As will be described later, the correspondence detection unit 252 synchronizes audio data from the cameras 11, thereby detecting a local time correspondence, and reports a detection result to the synchronization control unit 253.

As will be described later, the synchronization control unit 253 determines the start timing or end timing of recording of video data and audio data, and reports the start timing or end timing to the cameras 11 via the transmission control unit 255, thereby performing synchronization control of recording of video data and audio data of the cameras 11.

The command unit 254 transmits various commands input by using the input device 201 to the cameras 11 via the transmission control unit 255.

The transmission control unit 255 performs control of transmission processing of the communication device 205.

[Processing at the Time of Shooting Start of the Shooting System 1]

Next, processing at the time of shooting start of the shooting system 1 is described with reference to the flowchart of FIG. 6. This processing starts when, for example, a user inputs a command to start shooting to the information processing terminal 12 via the input device 201 and the command is supplied to the command unit 254.

Figure 7:
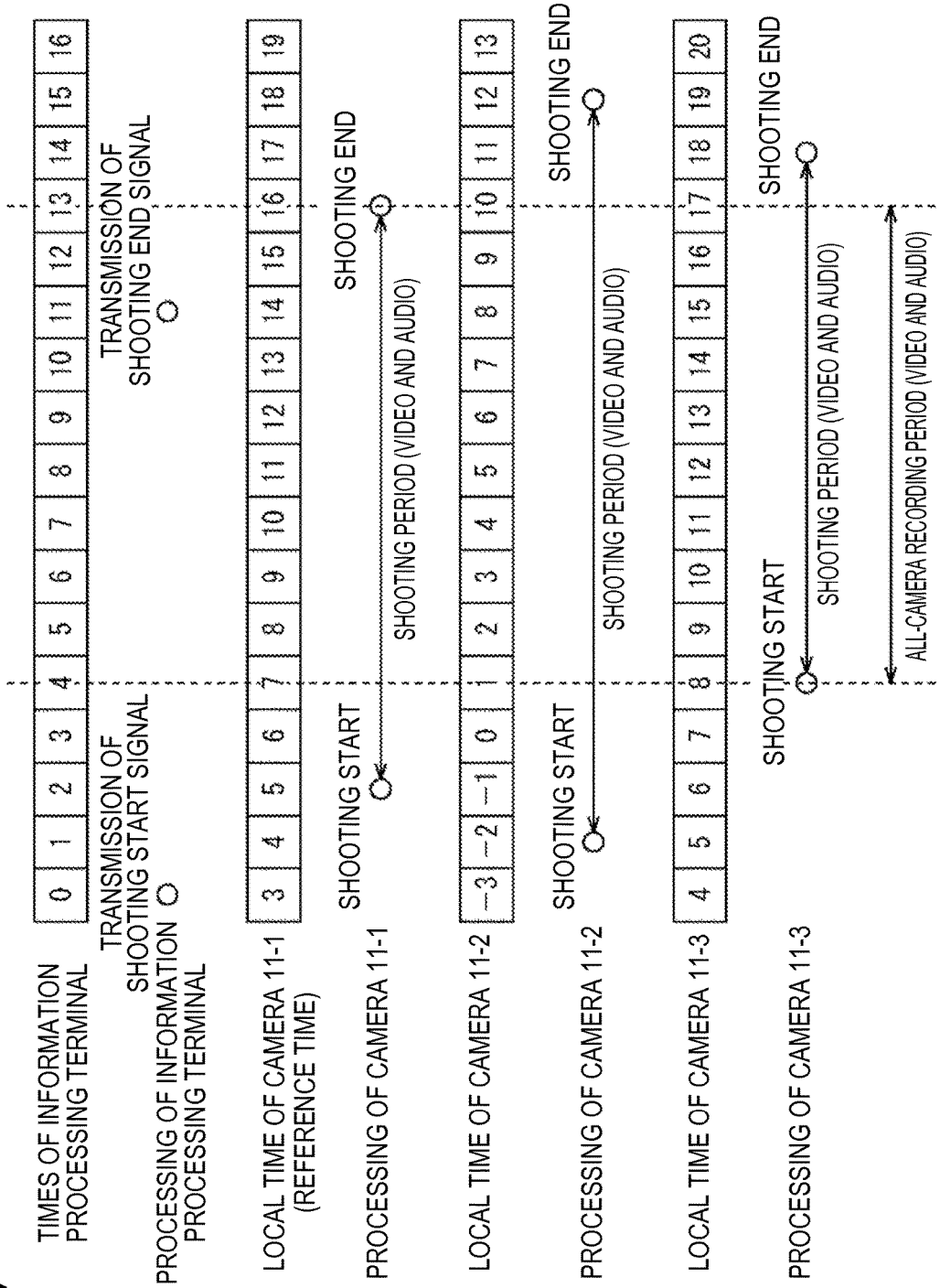
FIG. 7 is a timing chart illustrating the flow of processing of a shooting system at the time of shooting start and at the time of shooting end.

Hereinafter, the case of shooting with three cameras, the cameras 11-1 to 11-3, will be described as a specific example, referring to the timing chart of FIG. 7 as appropriate. FIG. 7 illustrates the flow of processing of the information processing terminal 12 and the cameras 11-1 to 11-3 from the start to the end of shooting.

Note that the numbers in the boxes arranged in the horizontal direction in FIG. 7 schematically show the local time of each of the information processing terminal 12 and the cameras 11-1 to 11-3. That is, a time in each box is not the actual time but is expressed by elapsed time (e.g., in seconds) relative to a time point expressed by "0". The boxes arranged in the same column in the vertical direction express local times of the devices at the same time. For example, time 0 of the information processing terminal 12, time 3 of the camera 11-1, time −3 of the camera 11-2, and time 4 of the camera 11-3 in the boxes arranged in the leftmost column in the figure express local times of the devices at the same time. Accordingly, in this example, local time of the devices does not coincide but has differences.

Figure 8:
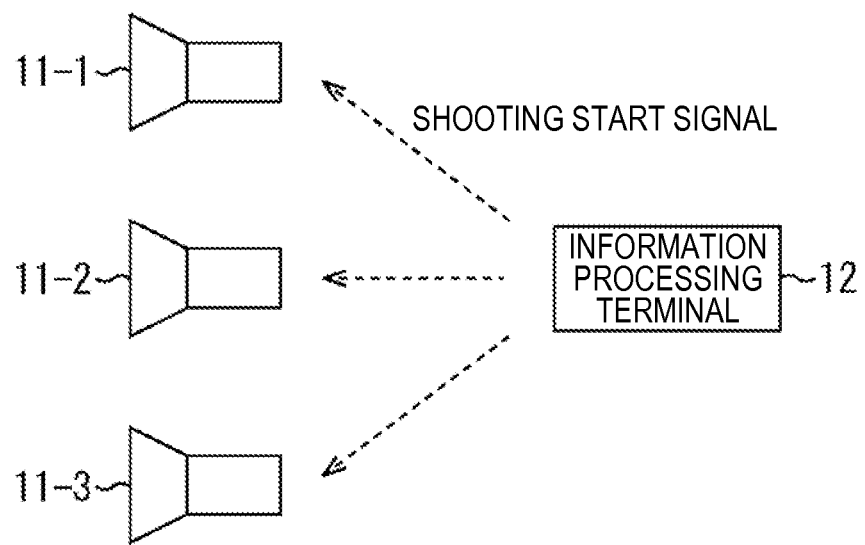
FIG. 8 is a view for describing processing of a shooting system at the time of shooting start.

In step S1, the information processing terminal 12 transmits a shooting start signal to the cameras 11. Specifically, the command unit 254 of the information processing terminal 12 generates a shooting start signal for commanding the cameras 11 to start shooting, and supplies the shooting start signal to the transmission control unit 255. The communication device 205 transmits the shooting start signal to the cameras 11, as illustrated in FIG. 8, under the control of the transmission control unit 255.

In the example of FIG. 7, the information processing terminal 12 transmits the shooting start signal at local time 0.

In step S2, the camera 11 starts shooting at a time point where the shooting start signal has been received. Specifically, the reception control unit 151 of the camera 11 receives the shooting start signal via the antenna 112 and the communication circuit 111, and supplies the shooting start signal to the shooting control unit 152 and the recording control unit 153. The shooting control unit 152 controls the image sensor 102, the AFE circuit 103, the image processing circuit 104, and the like to start shooting. The shooting control unit 152 also controls the audio processing circuit 107 and the like to start acquisition of audio. Furthermore, the shooting control unit 152 reports the start of shooting to the transmission control unit 154.

The recording control unit 153 controls the image processing circuit 104 and the like to cause video data obtained as a result of shooting to be temporarily recorded on the RAM 113 together with an acquisition time. Furthermore, the recording control unit 153 controls the audio processing circuit 107 and the like to cause audio data acquired via the microphone 106 to be temporarily recorded on the RAM 113 together with an acquisition time. Note that the acquisition times of video data and audio data are expressed by the local time of each camera 11. Furthermore, the recording control unit 153 reports the start of temporary recording of video data and audio data on the RAM 113 to the transmission control unit 154.

Note that time taken from transmission of the shooting start signal by the information processing terminal 12 to reception of the shooting start signal by the cameras 11 varies depending on a communication method, a communication state, distance, or the like between the information processing terminal 12 and the cameras 11. As a result, variations occur in times at which the cameras 11 start shooting and start acquisition of video data and audio data.

In the example of FIG. 7, the cameras 11-1, 11-2, and 11-3 start shooting and start acquisition of video data and audio data when their local times are 5, −2, and 8, respectively. Note that these local times are 2, 1, and 4, respectively, when expressed by local times of the information processing terminal 12 and exhibit variations.

Figure 9:
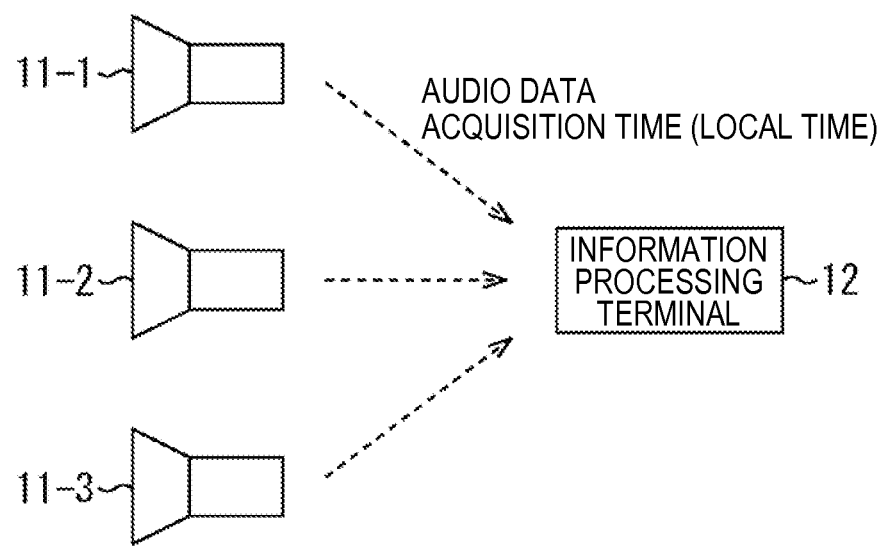
FIG. 9 is a view for describing processing of a shooting system at the time of shooting start.

In step S3, the camera 11 transmits audio data and an acquisition time to the information processing terminal 12 at a predetermined interval. For example, the transmission control unit 154 of the camera 11 reads audio data recorded on the RAM 113 every certain period. Then, the transmission control unit 154 transmits the read audio data and its acquisition time to the information processing terminal 12, as illustrated in FIG. 9, via the communication circuit 111 and the antenna 112. Thus, acquired audio data is divided into a plurality of blocks, and transmitted at a predetermined interval in units of blocks. At this time, data to be transmitted may be compressed before transmission.

As an acquisition time transmitted together with audio data, for example, a local time at which a beginning part of audio data to be transmitted is acquired is set. Hereinafter, this acquisition time of audio data is called a local acquisition time.

In the example of FIG. 7, the camera 11-1 transmits audio data and local acquisition time 5 to the information processing terminal 12 first, and subsequently, transmits audio data and a local acquisition time periodically. Note that the local acquisition time (time 5) of the audio data to be transmitted first also expresses a shooting start time (hereinafter called a local shooting start time) of the camera 11-1 and an acquisition start time (hereinafter called a local acquisition start time) of video data and audio data based on local time.

Similarly, the camera 11-2 transmits audio data and local acquisition time −2 to the information processing terminal 12 first, and subsequently, transmits audio data and a local acquisition time periodically. The camera 11-3 transmits audio data and local acquisition time 8 to the information processing terminal 12 first, and subsequently, transmits audio data and a local acquisition time periodically.

In step S4, the information processing terminal 12 receives audio data and an acquisition time of each camera 11 at a predetermined interval. Specifically, the reception control unit 251 of the information processing terminal 12 receives, via the communication device 205, audio data and a local acquisition time transmitted from each camera 11 at a predetermined interval. The reception control unit 251 supplies the audio data and the local acquisition time received from each camera 11 to the correspondence detection unit 252. At this time, when received data is compressed, decompression processing is performed.

In step S5, the correspondence detection unit 252 of the information processing terminal 12 performs matching of audio data of the cameras 11 and synchronizes the audio data. Specifically, when the cameras 11 are present at rather close range or in the same space (e.g., the same room), audio data acquired at the same time are likely to be similar. Accordingly, the correspondence detection unit 252 performs matching of audio data of the cameras 11 by a predetermined technique, and detects similar parts of the audio data, for example. Then, the correspondence detection unit 252 matches the timings of the detected similar parts to synchronize the audio data.

As described above, audio data is transmitted in units of blocks from each camera 11 at a predetermined interval. Thus, acquisition of audio data of the cameras 11 and synchronization processing of the information processing terminal 12 are pipelined to be executed in parallel, which allows synchronization of audio data of the cameras 11 at higher speed.

Note that, for example, it is possible to command the cameras 11 from the information processing terminal 12 to end transmission and reception of audio data, at a time point where audio data have been synchronized. Even at a stage where audio data have not been synchronized, it is possible to command the cameras 11 from the information processing terminal 12 to end transmission and reception of audio data, at a time point where audio data sufficient for synchronization have been received. Alternatively, it is possible to decide the size of audio data to be transmitted and received in advance, and end transmission and reception of audio data at a time point where the amount of transmitted and received audio data has reached the size. Thus, the load of communication between the cameras 11 and the information processing terminal 12 can be reduced.

In step S6, the correspondence detection unit 252 of the information processing terminal 12 detects a correspondence of local time of the cameras 11. Specifically, the correspondence detection unit 252 can find a local time at which each part of audio data has been acquired by the camera 11, on the basis of a local acquisition time of the audio data and elapsed time from a beginning part. Accordingly, the correspondence detection unit 252 can find local times at which synchronizing parts of audio data have been acquired by the cameras 11. Since synchronizing parts of audio data are parts that have been acquired by the cameras 11 at substantially the same time, the found local times of the cameras 11 correspond to substantially the same time.

Accordingly, the correspondence detection unit 252 detects a local time correspondence on the basis of local times of the cameras 11 at synchronizing parts of audio data. For example, the correspondence detection unit 252 sets reference time and detects, as a local time correspondence, a difference between the set reference time and the local time of each camera 11. Accordingly, this local time correspondence expresses a difference in local time between the cameras 11 relative to the reference time. Note that as the reference time, for example, local time of one of the cameras 11 and the information processing terminal 12 can be set. Then, the correspondence detection unit 252 supplies a detection result of the local time correspondence to the synchronization control unit 253.

For example, in the example of FIG. 7, when it is assumed that audio data have been synchronized at a beginning part of audio data from the camera 11-3, for example, local times of the cameras 11 for the beginning part are detected. That is, local time 7 of the camera 11-1, local time 1 of the camera 11-2, and local time 8 of the camera 11-3 are detected as local times of the cameras 11 at the same time. When, for example, the local time of the camera 11-1 is set as reference time, a difference 0 between the reference time and the local time of the camera 11-1, a difference −6 between the reference time and the local time of the camera 11-2, and a difference 1 between the reference time and the local time of the camera 11-3 are detected as a local time correspondence.

Hereinafter, description is given on the case where the local time of the camera 11-1 is set as reference time.

In step S7, the synchronization control unit 253 of the information processing terminal 12 detects a time at which all the cameras 11 have started shooting. Specifically, the synchronization control unit 253 converts local shooting start times of the cameras 11 to times based on reference time (hereinafter called reference shooting start times), on the basis of the local time correspondence. Then, the synchronization control unit 253 detects the latest time among the reference shooting start times of the cameras 11 as a time at which all the cameras 11 have started shooting (hereinafter called an all-camera shooting start time).

In the example of FIG. 7, since the shooting start time of the camera 11-3 is the latest, time 7, which is a reference time (a local time of the camera 11-1) for a local shooting start time of the camera 11-3, is detected as the all-camera shooting start time.

In step S8, the synchronization control unit 253 of the information processing terminal 12 sets a recording start time. For example, the synchronization control unit 253 sets the all-camera shooting start time or a time that is predetermined time after the all-camera shooting start time as a recording start time. Note that this recording start time is a time based on reference time and is hereinafter called a reference recording start time.

In step S9, the synchronization control unit 253 of the information processing terminal 12 converts the recording start time to local times of the cameras 11. That is, the synchronization control unit 253 finds local times (hereinafter called local recording start times) of the cameras 11 for the reference recording start time common to the cameras 11, on the basis of the local time correspondence.

In the example of FIG. 7, for example, when the all-camera shooting start time is set as the reference recording start time, the reference recording start time is set at time 7 in the reference time. Thus, a local recording start time of the camera 11-1 is 7, a local recording start time of the camera 11-2 is 1, and a local recording start time of the camera 11-3 is 8.

Figure 10:
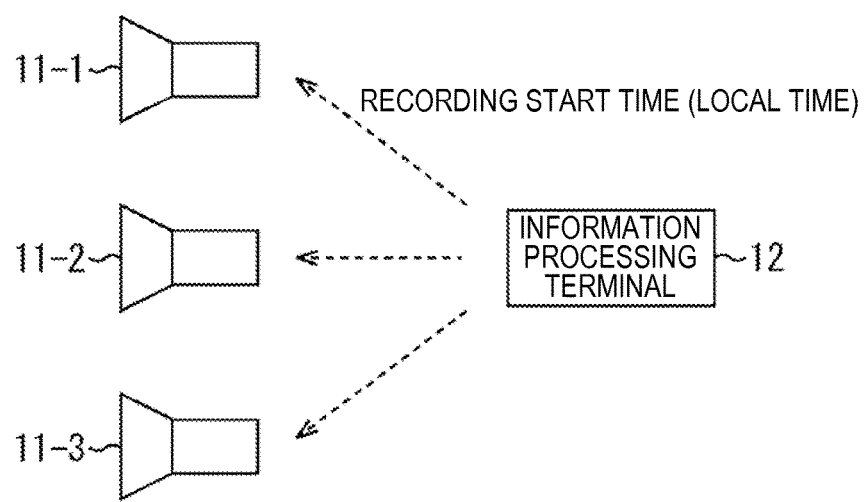
FIG. 10 is a view for describing processing of a shooting system at the time of shooting start.

In step S10, the synchronization control unit 253 of the information processing terminal 12 transmits the converted recording start time to the cameras 11. That is, the synchronization control unit 253 transmits, via the transmission control unit 255 and the communication device 205, a local recording start time set for each camera 11 to the corresponding camera 11, as illustrated in FIG. 10. In this manner, local recording start times are individually reported to the cameras 11 from the information processing terminal 12, as start timing at which the cameras 11 synchronously start recording of video data and audio data.

At this time, it is possible to issue a group ID representing a unit of video data and audio data recorded synchronously by the cameras 11, and transmit the group ID together with the local recording start times. That is, this group ID is issued for each unit of video data and audio data recorded synchronously by the cameras 11, and is used for grouping the video data and audio data as one unit.

In the example of FIG. 7, local recording start time 7 is transmitted to the camera 11-1, local recording start time 1 is transmitted to the camera 11-2, and local recording start time 8 is transmitted to the camera 11-3.

Then, the processing at the time of shooting start of the information processing terminal 12 ends.

In step S11, the camera 11 starts recording of video data and audio data at the received recording start time. Specifically, the reception control unit 151 of the camera 11 receives the local recording start time, which has been transmitted from the information processing terminal 12, via the antenna 112 and the communication circuit 111, and supplies the local recording start time to the recording control unit 153.

The recording control unit 153 performs control so that, among video data and audio data temporarily recorded on the RAM 113, video data and audio data having been acquired after the received local recording start time are recorded on the recording medium 117. In addition, the recording control unit 153 performs control so that video data and audio data having been acquired after the reception of the local recording start time are directly recorded on the recording medium 117. In this manner, official recording of video data and audio data on the recording medium 117 is started at the local recording start time.

In a case such as when sufficient capacity of the RAM 113 cannot be secured, for example, it is possible to record video data and audio data directly on the recording medium 117 from the time of shooting start. In this case, the recording control unit 153 performs control so that official recording of video data and audio data on the recording medium 117 is started at the local recording start time by the following method, for example.

For example, the recording control unit 153 performs control so that a local recording start time or a position of video data and audio data that corresponds to the local recording start time is recorded on the recording medium 117 in association with the video data and audio data. In this case, for example, in the camera 11, a reproducing device of video data and audio data, or the like, hiding processing is performed so that data before the local recording start time is hidden from a user.

Alternatively, for example, the recording control unit 153 performs control so that video data and audio data before the local recording start time are erased from the recording medium 117.

When a group ID has been received from the information processing terminal 12, the recording control unit 153 performs control so that the received group ID is recorded on the recording medium 117 in association with video data and audio data.

In the example of FIG. 7, the cameras 11-1 to 11-3 start recording of video data and audio data at local time 7, local time 1, and local time 8, respectively.

Then, the processing at the time of shooting start of the cameras 11 ends.

[Processing at the Time of Shooting End of the Shooting System 1]

Figure 6:
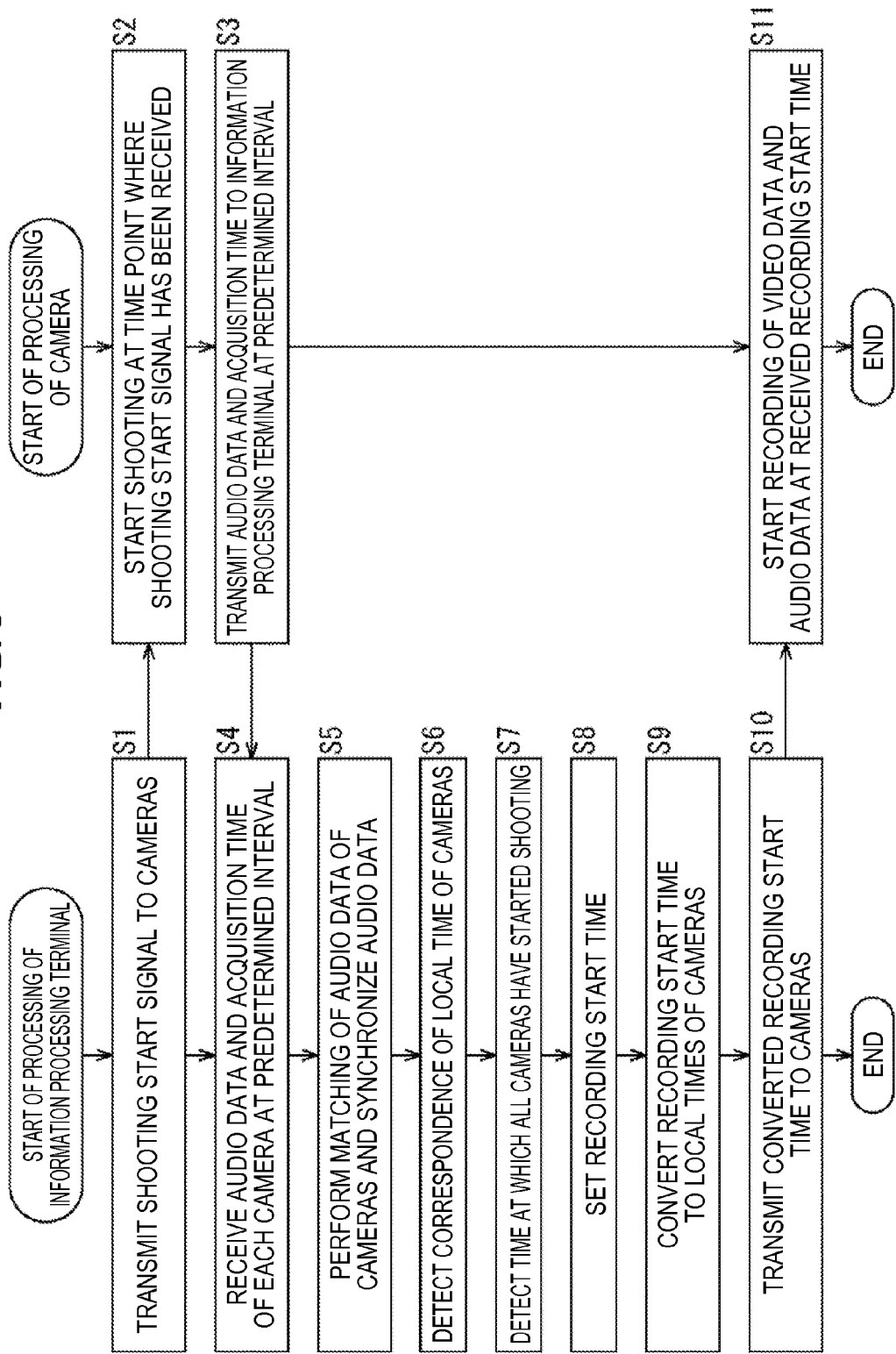
FIG. 6 is a flowchart for describing processing of a shooting system at the time of shooting start.
Figure 11:
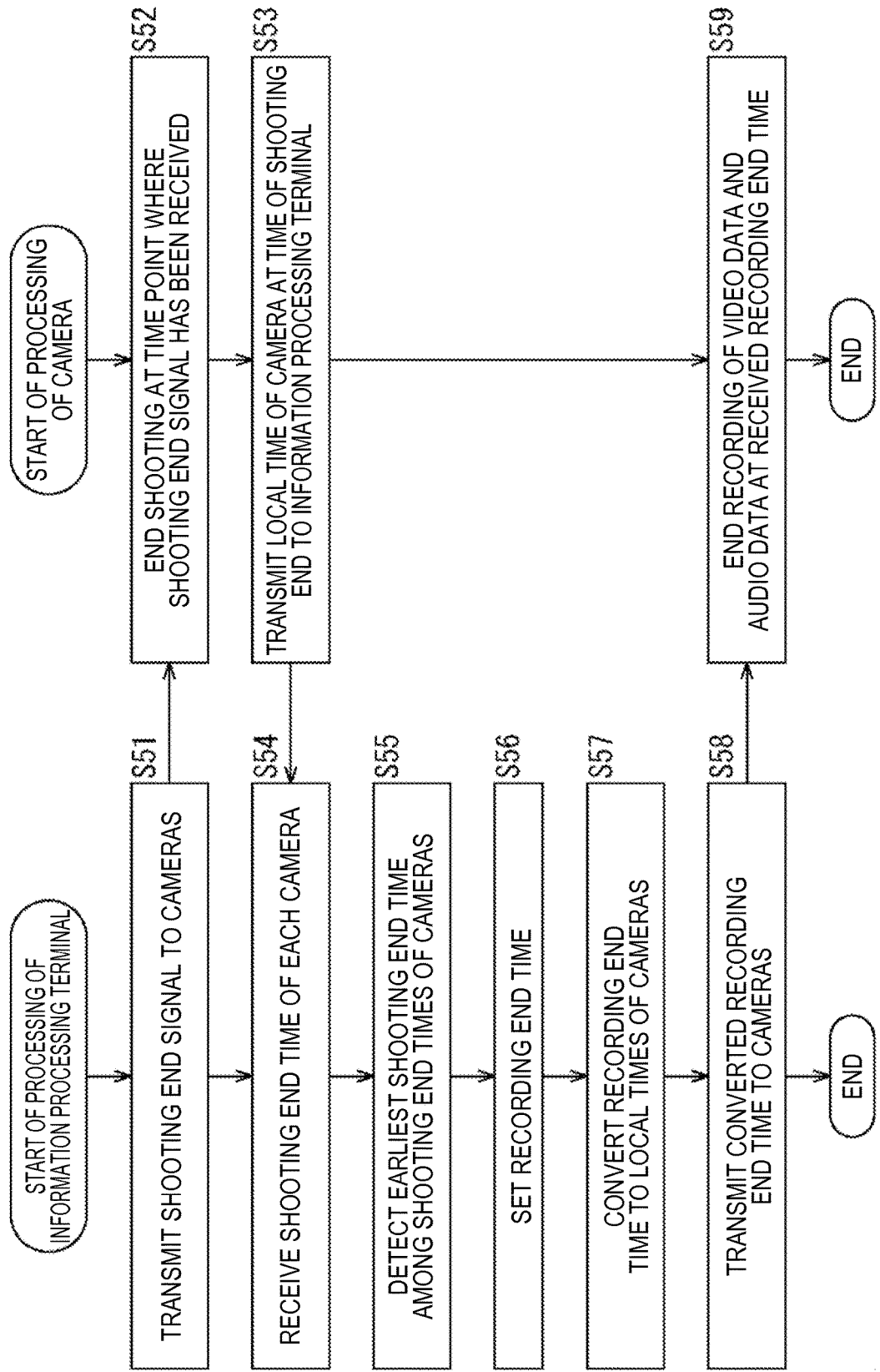
FIG. 11 is a flowchart for describing processing of a shooting system at the time of shooting end.

Next, processing at the time of shooting end, which is executed after processing at the time of shooting start, of the shooting system 1 of FIG. 6 is described with reference to the flowchart of FIG. 11. This processing starts when, for example, a user inputs a command to end shooting to the information processing terminal 12 via the input device 201 and the command is supplied to the command unit 254.

Hereinafter, as with the processing at the time of shooting start, the case of shooting with three cameras, the cameras 11-1 to 11-3, will be described as a specific example, referring to the timing chart of FIG. 7 as appropriate.

Figure 12:
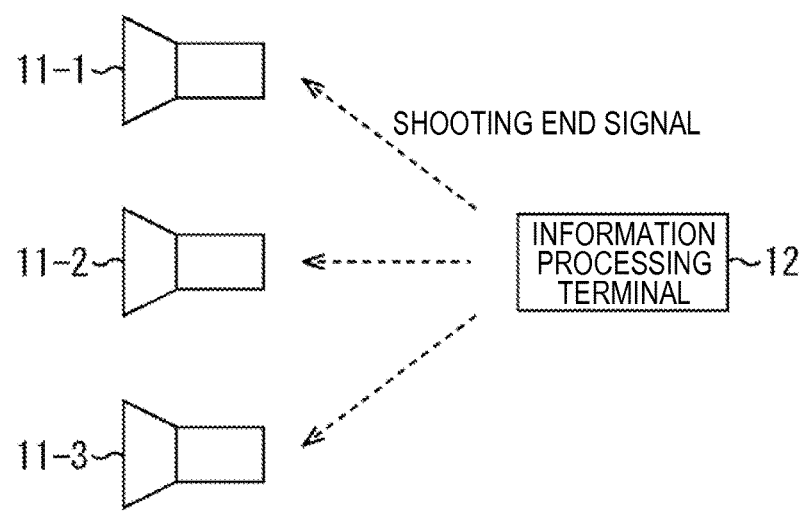
FIG. 12 is a view for describing processing of a shooting system at the time of shooting end.
Figure 13:
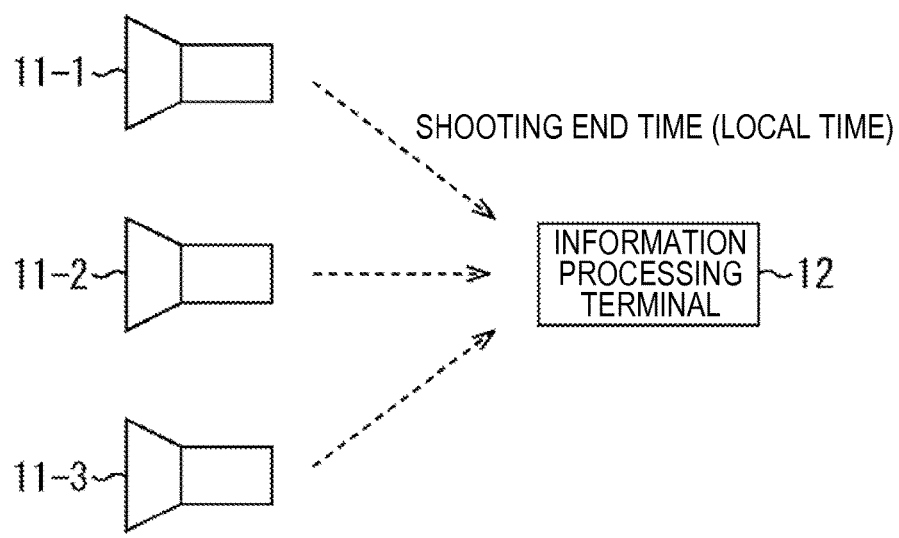
FIG. 13 is a view for describing processing of a shooting system at the time of shooting end.

In step S51, the information processing terminal 12 transmits a shooting end signal to the cameras 11. Specifically, the command unit 254 of the information processing terminal 12 generates a shooting end signal for commanding the cameras 11 to end shooting, and supplies the shooting end signal to the transmission control unit 255. The communication device 205 transmits the shooting end signal to the cameras 11, as illustrated in FIG. 12, under the control of the transmission control unit 255.

In the example of FIG. 7, the information processing terminal 12 transmits the shooting end signal at local time 11.

In step S52, the camera 11 ends shooting at a time point where the shooting end signal has been received. Specifically, the reception control unit 151 of the camera 11 receives the shooting end signal via the antenna 112 and the communication circuit 111, and supplies the shooting end signal to the shooting control unit 152. The shooting control unit 152 controls the image sensor 102, the AFE circuit 103, the image processing circuit 104, and the like to end shooting. The shooting control unit 152 also controls the audio processing circuit 107 and the like to end acquisition of audio. Furthermore, the shooting control unit 152 reports the end of shooting to the transmission control unit 154.

Note that, as with the shooting start signal, time taken from transmission of the shooting end signal by the information processing terminal 12 to reception of the shooting end signal by the cameras 11 varies among the cameras 11. As a result, variations occur in times at which the cameras 11 end shooting and end acquisition of video data and audio data.

In the example of FIG. 7, the cameras 11-1, 11-2, and 11-3 end shooting and end acquisition of video data and audio data when their local times are 16, 12, and 18, respectively. Note that these local times are 13, 15, and 14, respectively, when expressed by local times of the information processing terminal 12 and exhibit variations.

In step S53, the camera 11 transmits a local time of the camera 11 at the time of shooting end to the information processing terminal 12. Specifically, the transmission control unit 154 transmits a local time (hereinafter called a local shooting end time) of the camera 11 at the time of shooting end to the information processing terminal 12 via the communication circuit 111 and the antenna 112.

In the example of FIG. 7, the camera 11-1 transmits local shooting end time 16 to the information processing terminal 12, the camera 11-2 transmits local shooting end time 12 to the information processing terminal 12, and the camera 11-3 transmits local shooting end time 18 to the information processing terminal 12.

In step S54, the information processing terminal 12 receives a shooting end time of each camera 11. Specifically, the reception control unit 251 of the information processing terminal 12 receives, via the communication device 205, a local shooting end time transmitted from each camera 11, and supplies the local shooting end time to the synchronization control unit 253.

In step S55, the synchronization control unit 253 of the information processing terminal 12 detects the earliest shooting end time among the shooting end times of the cameras 11. Specifically, the synchronization control unit 253 converts local shooting end times of the cameras 11 to times based on reference time (hereinafter called reference shooting end times), on the basis of the local time correspondence having been detected in the above-described processing of step S6 of FIG. 6. Then, the synchronization control unit 253 detects the earliest time among the reference shooting end times of the cameras 11 (hereinafter called an earliest shooting end time).

In the example of FIG. 7, when the local time of the camera 11-1 is set as reference time as described above, local shooting end time 16 of the camera 11-1 remains unconverted. Meanwhile, local shooting end time 12 of the camera 11-2 is converted to time 18 based on the reference time, and local shooting end time 18 of the camera 11-3 is converted to time 17 based on the reference time. Then, time 16, which is a shooting end time based on the reference time of the camera 11-1, is detected as the earliest shooting end time.

In step S56, the synchronization control unit 253 of the information processing terminal 12 sets a recording end time. For example, the synchronization control unit 253 sets the earliest shooting end time or a time that is predetermined time before the earliest shooting end time as a recording end time. Note that this recording end time is a time based on reference time and is hereinafter called a reference recording end time.

In step S57, the synchronization control unit 253 of the information processing terminal 12 converts the recording end time to local times of the cameras 11. That is, the synchronization control unit 253 finds local times (hereinafter called local recording end times) of the cameras 11 corresponding to the reference recording end time common to the cameras 11, on the basis of the local time correspondence.

In the example of FIG. 7, for example, when the earliest shooting end time is set as the reference recording end time, the reference recording end time is set at time 16 in the reference time. Thus, a local recording end time of the camera 11-1 is 16, a local recording end time of the camera 11-2 is 10, and a local recording end time of the camera 11-3 is 17.

Figure 14:
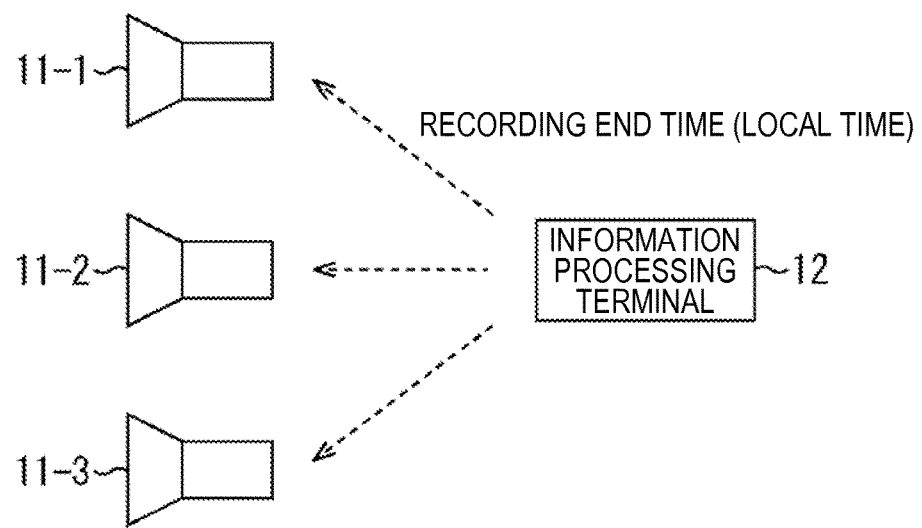
FIG. 14 is a view for describing processing of a shooting system at the time of shooting end.

In step S58, the synchronization control unit 253 of the information processing terminal 12 transmits the converted recording end time to the cameras 11. That is, the synchronization control unit 253 transmits, via the transmission control unit 255 and the communication device 205, a local recording end time set for each camera 11 to the corresponding camera 11, as illustrated in FIG. 14. In this manner, local recording end times are individually reported to the cameras 11 from the information processing terminal 12, as end timing at which the cameras 11 synchronously end recording of video data and audio data.

In the example of FIG. 7, local recording end time 16 is transmitted to the camera 11-1, local recording end time 10 is transmitted to the camera 11-2, and local recording end time 17 is transmitted to the camera 11-3.

Then, the processing at the time of shooting end of the information processing terminal 12 ends.

In step S59, the camera 11 ends recording of video data and audio data at the received recording end time. Specifically, the reception control unit 151 of the camera 11 receives the local recording end time, which has been transmitted from the information processing terminal 12, via the antenna 112 and the communication circuit 111, and supplies the local recording end time to the recording control unit 153.

The recording control unit 153 performs control so that official recording of video data and audio data on the recording medium 117 is ended at the local recording end time by the following method, for example.

For example, the recording control unit 153 performs control so that a local recording end time or a position of video data and audio data that corresponds to the local recording end time is recorded on the recording medium 117 in association with the video data and audio data. In this case, for example, in the camera 11, a reproducing device of video data and audio data, or the like, hiding processing is performed so that data after the local recording end time is hidden from a user.

Alternatively, for example, the recording control unit 153 performs control so that, among video data and audio data recorded on the recording medium 117, data after the local recording end time are erased.

In the example of FIG. 7, the cameras 11-1 to 11-3 end recording of video data and audio data at local time 16, local time 10, and local time 17, respectively.

Then, the processing at the time of shooting end of the cameras 11 ends.

In the above manner, even when there occur non-coincidence of local time of the cameras 11 and variations in the timings at which the cameras 11 receive a command from the information processing terminal 12, it is possible to synchronize the timings at which the cameras 11 start and end recording of video data and audio data, without using special equipment or complicated processing.

For example, in the example of FIG. 7, shooting periods of the cameras 11-1 to 11-3 are a period from time 5 to time 16 in local time, a period from time −2 to time 12, and a period from time 8 to time 18 in local time, respectively, and exhibit variations in timing and length. In contrast, by performing the above processing, recording periods of video data and audio data of the cameras 11-1 to 11-3 can be synchronized with a period from time 7 to time 16 of the reference time (local time of the camera 11-1).

By synchronizing the start timings and the end timings of recording of video data and audio data of the cameras 11, for example, editing after shooting is facilitated.

[Second Embodiment of Processing at the Time of Shooting Start and at the Time of Shooting End of the Shooting System 1]

Figure 15:
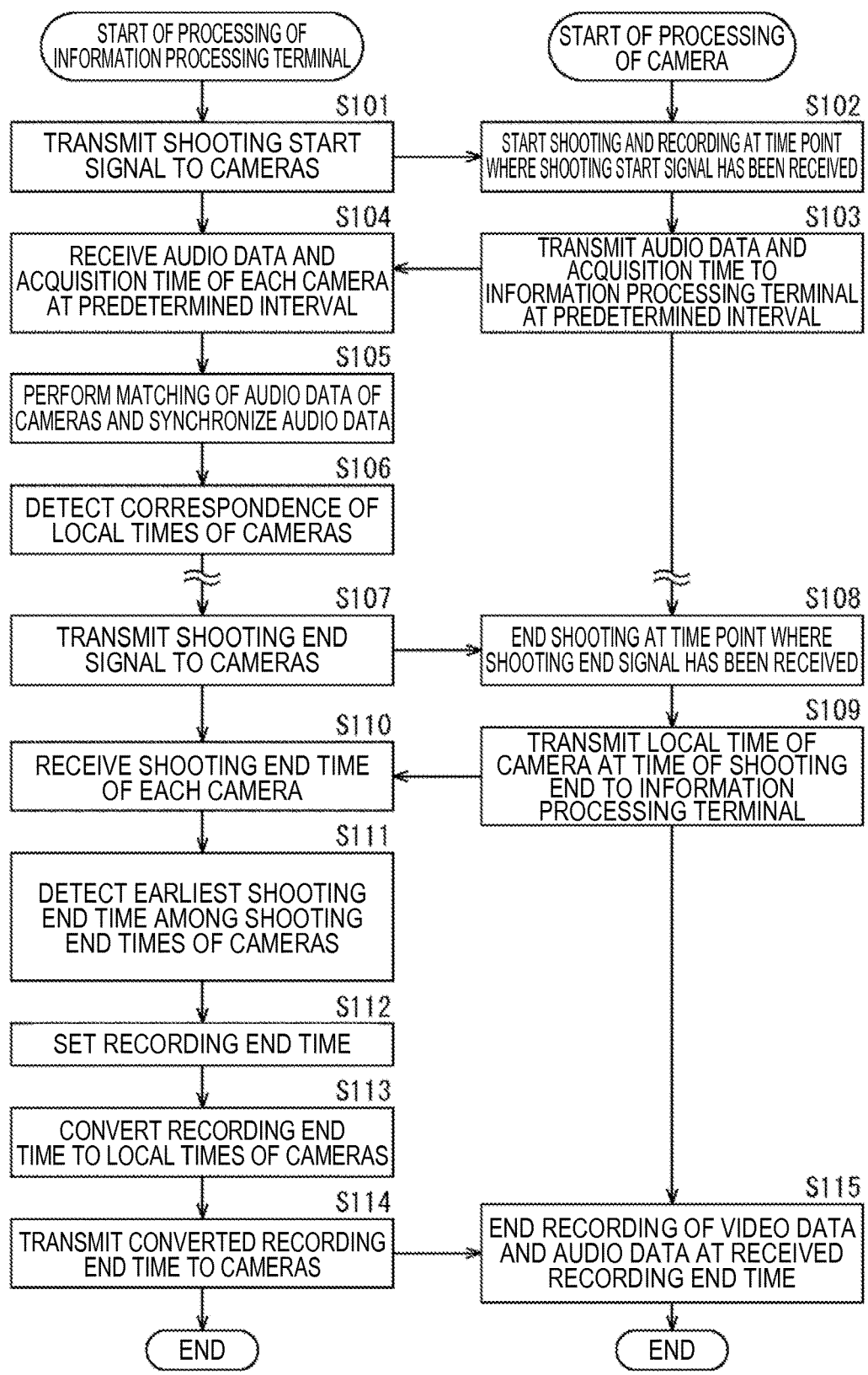
FIG. 15 is a flowchart for describing a second embodiment of processing of a shooting system at the time of shooting start and at the time of shooting end.

In the above description, both the start timings and the end timings of recording of video data and audio data are synchronized; however, only either of these timings may be synchronized. For example, in the case of synchronizing only the start timings, the processing of FIG. 6 is performed and the processing of FIG. 11 is skipped. In the case of synchronizing only the end timings, processing of the shooting system 1 is performed in accordance with the flowchart of FIG. 15.

Specifically, in step S101, as in the processing of step S1 of FIG. 6, a shooting start signal is transmitted from the information processing terminal 12 to the cameras 11.

In step S102, the camera 11 starts shooting and recording at a time point where the shooting start signal has been received. Specifically, the reception control unit 151 of the camera 11 receives the shooting start signal via the antenna 112 and the communication circuit 111, and supplies the shooting start signal to the shooting control unit 152 and the recording control unit 153. The shooting control unit 152 controls the image sensor 102, the AFE circuit 103, the image processing circuit 104, and the like to start shooting. The shooting control unit 152 also controls the audio processing circuit 107 and the like to start acquisition of audio. Furthermore, the shooting control unit 152 reports the start of shooting to the transmission control unit 154.

The recording control unit 153 controls the image processing circuit 104 and the like to start recording of video data obtained as a result of shooting on the recording medium 117. Furthermore, the recording control unit 153 controls the audio processing circuit 107 and the like to start recording of audio data corresponding to audio acquired via the microphone 106 on the recording medium 117. That is, in the second embodiment, the cameras 11 do not perform synchronization with the other cameras 11, and start recording of video data and audio data at their respective timings concurrently with shooting start.

Subsequently, in steps S103 to S106, processing similar to that of steps S3 to S6 of FIG. 6 is performed. Thus, audio data acquired by the cameras 11 are synchronized and a local time correspondence is detected.

After that, processing corresponding to steps S7 to S11 of FIG. 6 is not performed, and shooting remains continued after the cameras 11 have started recording of video data and audio data at their respective timings.

Then, in steps S107 to S115, processing similar to that of steps S51 to S59 of FIG. 10 is performed, and processing ends. Thus, shooting of the cameras 11 ends, and the cameras 11 synchronously end recording of video data and audio data.

2. Modification Examples

Hereinafter, modification examples of the above-described embodiments of the present technology will be described.

Modification Example 1: Modification Example Related to Setting Method of Recording End Time For example, the information processing terminal 12 may set a recording end time of the cameras 11 without using shooting end times of the cameras 11. Specifically, the information processing terminal 12 can know local times of the cameras 11 during shooting with predetermined accuracy, on the basis of a local time correspondence. Accordingly, for example, the information processing terminal 12 sets local recording end times corresponding to the same time, and transmits the local recording end times to the cameras 11 together with a shooting end signal. After receiving the shooting end signal, the cameras 11 end recording of video data and audio data at the received local recording end times. Thus, without reporting shooting end times to the information processing terminal 12 from the cameras 11, the cameras 11 can synchronously end recording of video data and audio data.

Modification Example 2: Modification Example Related to Reporting Method of Start Timing and End Timing of Recording or the Like In the above description, start timing at which the cameras 11 start recording is reported by times based on local time of the cameras 11 (i.e., local recording start times); however, another method may be used for reporting.

For example, the start timing may be reported by time relative to shooting start times. For example, in the case of the example of FIG. 7 described above, a shooting start time of the camera 11-1 is 7 and a recording start time is 9 in local time. Accordingly, for example, +2, which is elapsed time from the shooting start time to the recording start time, may be reported as the start timing to the camera 11-1. Thus, the camera 11-1 starts recording after time of +2 elapses from the shooting start time.

Alternatively, for example, the start timing may be reported by a frame number of video data, a sample number of audio data, or the like, instead of a time.

Note that end timing at which the cameras 11 end recording can also be reported by a similar method.

The timing of issuing and transmitting a group ID need not be the above-described timing. For example, in step S1 of FIG. 6 or step S101 of FIG. 15, a group ID may be transmitted to the cameras 11 together with a shooting start signal and recorded in association with video data and audio data in the cameras 11. Alternatively, for example, in step S51 of FIG. 11 or step S107 of FIG. 15, a group ID may be transmitted to the cameras 11 together with a shooting end signal and recorded in association with video data and audio data in the cameras 11.

Modification Example 3: Modification Example of System Configuration

For example, the present technology can have a configuration of cloud computing of sharing and collaboratively processing one function by a plurality of devices via a network.

Figure 16:
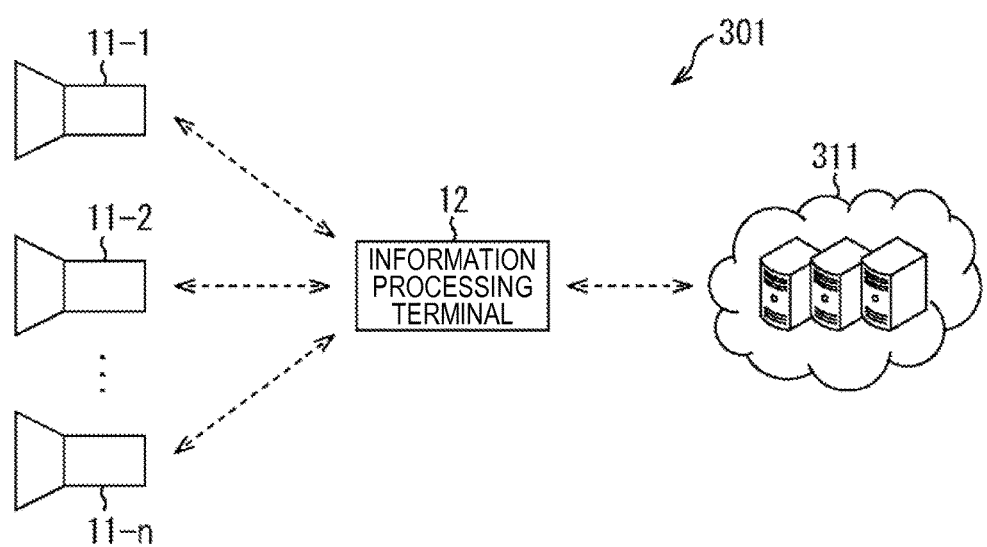
FIG. 16 is a block diagram illustrating a second embodiment of a shooting system to which the present technology is applied.

FIG. 16 is a block diagram illustrating an example configuration of a shooting system 301 having a configuration of cloud computing. In the figure, parts corresponding to those in FIG. 1 are given the same reference signs.

The shooting system 301 includes the cameras 11-1 to 11-n, the information processing terminal 12, and a computer group 311 including one or more computers. The information processing terminal 12 and the computer group 311 are mutually connected via a network, such as the Internet.

For example, the information processing terminal 12 transmits audio data received from the cameras 11 to the computer group 311, and performs the above-described processing in collaboration with the computer group 311. For example, the computer group 311 performs part or all of the above-described processing, such as detection of a local time correspondence and synchronization control of recording of video data and audio data.

Figure 17:
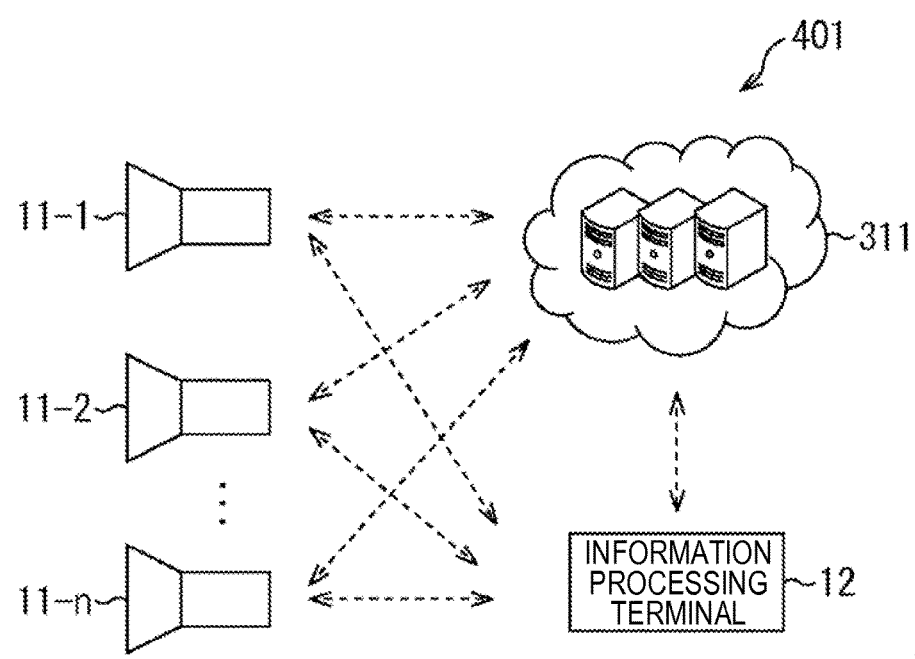
FIG. 17 is a block diagram illustrating a third embodiment of a shooting system to which the present technology is applied.

Alternatively, a configuration like that of a shooting system 401 of FIG. 17 can be adopted. The shooting system 401 differs from the shooting system 301 of FIG. 16 in that the cameras 11-1 to 11-n can communicate directly with the computer group 311. Accordingly, for example, audio data can be transmitted directly from the cameras 11-1 to 11-n to the computer group 311 without going through the information processing terminal 12, and detection of a local time correspondence, synchronization control of recording of video data and audio data, and the like can be performed in the computer group 311. In this case, for example, the information processing terminal 12 can be used as a remote controller that only commands the start, end, and the like of shooting of the cameras 11.

In the above description, an example is shown in which video data and audio data acquired by each camera 11 are recorded on the recording medium 117 in each camera 11. Meanwhile, in the present technology, for example, video data and audio data can be transmitted to and recorded in a device (hereinafter called a recording execution device) other than the camera 11, such as the information processing terminal 12 or the computer group 311. In this case, for example, the cameras 11 transmit local acquisition times, local recording start times, and local recording end times of video data and audio data to the recording execution device, together with video data and audio data. Thus, in the recording execution device, the start and the end of recording of video data and audio data from the cameras 11 can be synchronized.

When, for example, the information processing terminal 12 finds local recording start times and local recording end times and the computer group 311 performs recording of video data and audio data, the information processing terminal 12 can transmit the local recording start times and local recording end times directly to the computer group 311 without transmitting them to the cameras 11. Alternatively, for example, local recording start times and local recording end times of the cameras 11 may be found by the computer group 311.

Note that a recording target device need not be one device, and may be configured with a plurality of devices. That is, video data and audio data of the cameras 11 may be recorded in a plurality of recording target devices in a distributed manner.

Alternatively, when the function of the information processing terminal 12 is implemented in one of the plurality of cameras 11, and the camera 11 (hereinafter called master camera) performs the above-described processing of the information processing terminal 12, the information processing terminal 12 can be omitted.

In this case, for example, part of the function of the information processing terminal 12 can be implemented in the plurality of cameras 11 in a distributed manner. For example, in the case where it is necessary to extract a feature value of audio data in order to synchronize audio data, a feature value of audio data may be extracted by each camera 11 and data of the extracted feature value may be transmitted to the master camera.

Modification Example 4: Modification Example of Time-Series Data

In the above description, an example is shown in which time-series data for detection of a local time correspondence (hereinafter called data for detection) are audio data, and time-series data that are recorded synchronously (hereinafter called recording target data) are video data and audio data; however, the type and the number of data for detection and recording target data are not limited to the above-described example.

For example, other than the above-described audio data, for example, any time-series data that are acquired together with recording target data by a plurality of devices that acquire recording target data and can synchronize the devices can be used as data for detection. For example, time-series content such as video data, time-series sensor data representing a state of a device, surrounding environment, position, or the like, or the like can be used as data for detection. For example, in the case where video data and audio data of a plurality of cameras attached to helmets worn by persons are recorded synchronously, data of a gyro sensor or a vibration sensor that detects a motion of each camera is assumed to be used as data for detection.

Instead of the above-described content or sensor data itself, for example, time-series data of a feature value extracted therefrom can be used as data for detection.

Furthermore, it is possible to use two or more types of data for detection. For example, in the above embodiments, audio data and video data can both be used as data for detection. It is expected that, by increasing the number of types of data for detection, it is possible to improve the detection accuracy of a local time correspondence and to detect, even if part of time-series data cannot be synchronized, a local time correspondence by using other time-series data.

As recording target data, for example, any time-series data that can be earned by a plurality of devices and of which at least one of the start and the end of recording needs to be synchronized (e.g., various types of content or sensor data) can be adopted. The number of types of recording target data can be one or three or more.

Furthermore, the type of data for detection and the type of recording target data may overlap or not overlap with each other. In the above embodiments, an example is shown in which data for detection and recording target data overlap. As an example of no overlap, for example, a case where data for detection is audio data and recording target data is video data is assumed.

Furthermore, in the case where the type of data for detection and the type of recording target data overlap with each other, the present technology can be applied to any of the following patterns: a pattern where the data coincide completely, a pattern where the data coincide partly, and a pattern where either of the data is entirely included in the other.

[Example Configuration of Computer]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 18:
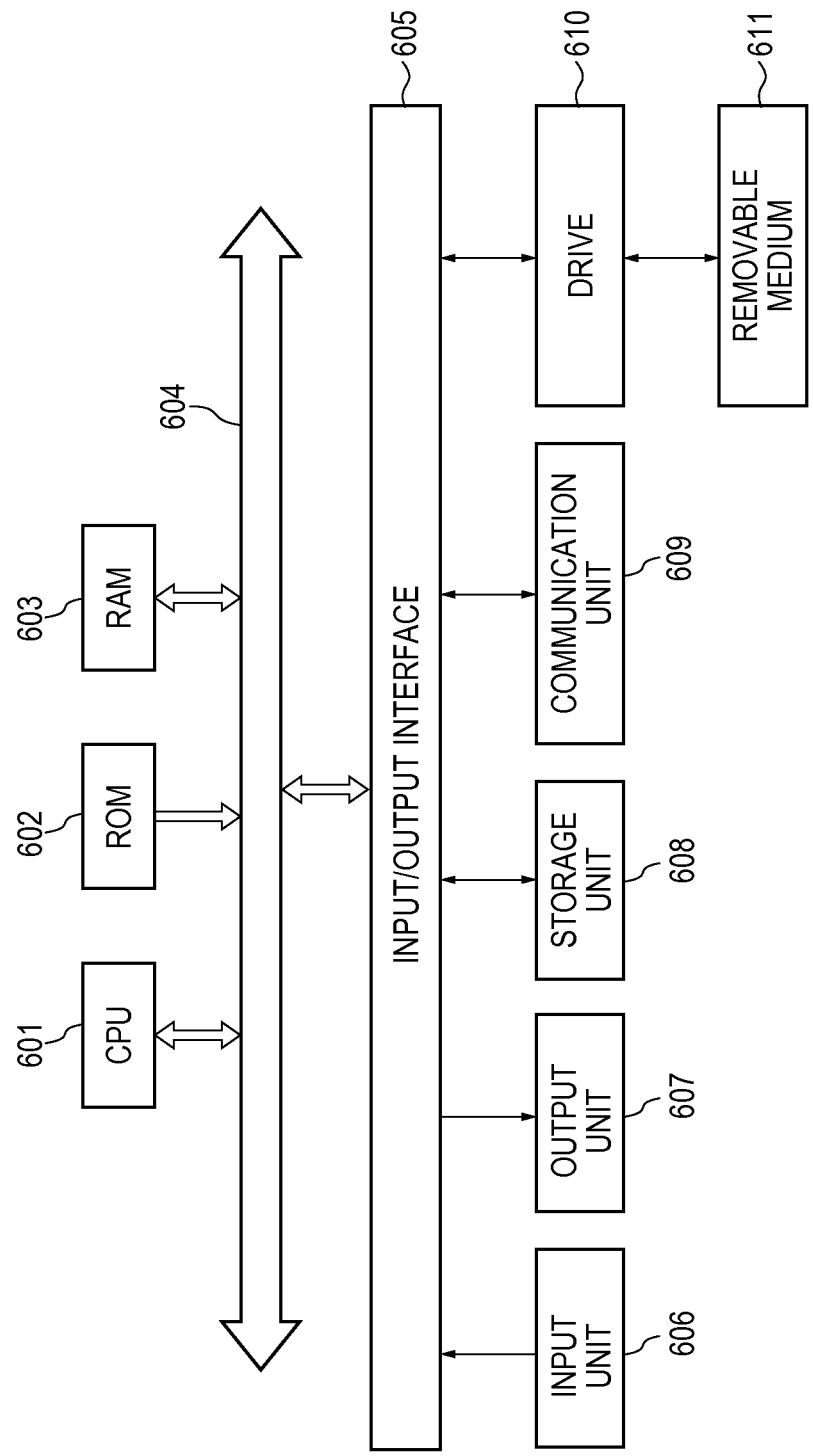
FIG. 18 is a block diagram illustrating an example configuration of a computer.

FIG. 18 is a block diagram illustrating an example configuration of the hardware of a computer that executes the series of processes described earlier according to a program.

In a computer, a central processing unit (CPU) 601, a read only memory (ROM) 602, and a random access memory (RAM) 603 are mutually connected by a bus 604.

An input/output interface 605 is also connected to the bus 604. An input unit 606, an output unit 607, a storage unit 608, a communication unit 609, and a drive 610 are connected to the input/output interface 605.

The input unit 606 is configured from a keyboard, a mouse, a microphone, or the like. The output unit 607 is configured from a display, a speaker, or the like. The storage unit 608 is configured from a hard disk, a non-volatile memory, or the like. The communication unit 609 is configured from a network interface or the like. The drive 610 drives a removable medium 611, such as a magnetic disk, an optical disk, a magneto-optical disk, or a semiconductor memory.

In the computer configured as described above, as one example the CPU 601 loads a program stored in the storage unit 608 via the input/output interface 605 and the bus 604 into the RAM 603 and executes the program to carry out the series of processes described earlier.

As one example, the program executed by the computer (the CPU 601) may be provided by being recorded on the removable medium 611 as a packaged medium or the like. The program can also be provided via a wired or wireless transfer medium, such as a local area network, the Internet, or a digital satellite broadcast.

In the computer, by loading the removable medium 611 into the drive 610, the program can be installed into the storage unit 608 via the input/output interface 605. It is also possible to receive the program from a wired or wireless transfer medium using the communication unit 609 and install the program into the storage unit 608. As another alternative, the program can be installed in advance into the ROM 602 or the storage unit 608.

Note that the program executed by the computer may be a program in which processes are carried out in a time series in the order described in this specification or may be a program in which processes are carried out in parallel or at necessary timing, such as when the processes are called.

In this specification, a system means a set of a plurality of constituent elements (e.g., devices or modules (parts)), regardless of whether all the constituent elements are in the same housing. Accordingly, a plurality of devices that are contained in different housings and connected via a network and one device in which a plurality of modules are contained in one housing are both systems.

An embodiment of the present technology is not limited to the embodiments described above, and various changes and modifications may be made without departing from the scope of the present technology.

For example, each step described by the above mentioned flow charts can be executed by one device or by allocating a plurality of devices.

In addition, in the case where a plurality of processes is included in one step, the plurality of processes included in this one step can be executed by one device or by allocating a plurality of devices.

Additionally, the present technology may also be configured as below.

(1)

An information processing device including:

a reception control unit configured to control reception of first time-series data acquired by a plurality of other information processing devices and acquisition times of the first time-series data based on local time, which is time in each of the other information processing devices; and a synchronization control unit configured to determine, on the basis of the first time-series data from the plurality of other information processing devices, start timing or end timing of recording of second time-series data acquired by the plurality of other information processing devices.

(2)

The information processing device according to (1), wherein the synchronization control unit determines, on the basis of the first time-series data from the plurality of other information processing devices, the start timing or the end timing based on the local time for each of the other information processing devices, and reports the start timing or the end timing to each of the other information processing devices.

(3)

The information processing device according to (1) or (2), further including:

a command unit configured to command the plurality of other information processing devices to start and end acquisition of the second time-series data.

(4)

The information processing device according to (3), wherein the synchronization control unit determines a latest time among times at which the plurality of other information processing devices have started acquisition of the first time-series data or a time later than the latest time, as the start timing.

(5)

The information processing device according to (3), wherein the reception control unit controls reception of end times of acquisition of the second time-series data based on the local time of each of the other information processing devices, and wherein the synchronization control unit determines an earliest time among the end times of the plurality of other information processing devices or a time earlier than the earliest time, as the end timing.

(6)

The information processing device according to any of (1) to (5), further including:

a correspondence detection unit configured to detect a difference in the local time of each of the other information processing devices by synchronizing the first time-series data from the plurality of other information processing devices, wherein the synchronization control unit determines the start timing or the end timing on the basis of the detected difference in the local time of each of the other information processing devices.

(7)

The information processing device according to (6), wherein the reception control unit controls reception of the first time-series data and the acquisition times of the first time-series data transmitted from the plurality of other information processing devices at a predetermined interval, and wherein the correspondence detection unit performs synchronization processing of the first time-series data in parallel with reception of the first time-series data performed every predetermined interval.

(8)

The information processing device according to any of (1) to (7), wherein a type of the first time-series data and a type of the second time-series data coincide at least partly.

(9)

The information processing device according to any of (1) to (8), wherein the first time-series data includes video data, audio data, or data of a sensor provided in the other information processing device, and the second time-series data includes video data or audio data.

(10)

An information processing method including:

a reception control step of controlling reception of first time-series data acquired by a plurality of other information processing devices and acquisition times of the first time-series data based on local time, which is time in each of the other information processing devices, through an information processing device; and a synchronization control step of determining, on the basis of the first time-series data from the plurality of other information processing devices, start timing or end timing of recording of second time-series data acquired by the plurality of other information processing devices through the information processing device.

(11)

A program for causing a computer of an information processing device to execute processing including:

a reception control step of controlling reception of first time-series data acquired by a plurality of other information processing devices and acquisition times of the first time-series data based on local time, which is time in each of the other information processing devices; and a synchronization control step of determining, on the basis of the first time-series data from the plurality of other information processing devices, start timing or end timing of recording of second time-series data acquired by the plurality of other information processing devices.

(12)

An information processing device including:

an acquisition control unit configured to control acquisition of first time-series data and second time-series data;

a reception control unit configured to control reception of the first time-series data acquired by one or more other information processing devices and acquisition times of the first time-series data based on local time, which is time in the other information processing devices; and a synchronization control unit configured to determine, on the basis of the first time-series data acquired by control through the acquisition control unit and the first time-series data from the other information processing devices, start timing or end timing of recording of the second time-series data acquired by control through the acquisition control unit and the second time-series data acquired by the other information processing devices.

(13)

An information processing device including:

an acquisition control unit configured to control acquisition of first time-series data and second time-series data;

a transmission control unit configured to control transmission of the first time-series data and an acquisition time of the first time-series data based on local time, which is time in a device, to a first other information processing device;

a reception control unit configured to receive start timing, which is synchronized with timing at which recording of the second time-series data acquired by one or more second other information processing devices is started and is based on the local time, or end timing, which is synchronized with timing at which recording of the second time-series data acquired by the second other information processing devices is ended and is based on the local time, from the first other information processing device; and a recording control unit configured to control start or end of recording of the second time-series data on the basis of the received start timing or end timing.

(14)

The information processing device according to (13), wherein the reception control unit controls reception of a command to start acquisition of the second time-series data from the first other information processing device, wherein the acquisition control unit performs control in a manner that acquisition of the second time-series data is started in accordance with the command from the first other information processing device, and wherein the recording control unit performs control in a manner that recording of the second time-series data is started together with the start of acquisition of the second time-series data and, when the start timing has been received from the first information processing device, the start timing is recorded in association with the second time-series data.

(15)

The information processing device according to (13), wherein the reception control unit controls reception of a command to start acquisition of the second time-series data from the first other information processing device, wherein the acquisition control unit performs control in a manner that acquisition of the second time-series data is started in accordance with the command from the first other information processing device, and wherein the recording control unit performs control in a manner that recording of the second time-series data is started together with the start of acquisition of the second time-series data and, when the start timing has been received from the first information processing device, the second time-series data before the start timing is erased.

(16)

The information processing device according to any of (13) to (15), wherein the recording control unit performs control in a manner that, when the end timing has been received from the first information processing device, the end timing is recorded in association with the second time-series data.

(17)

The information processing device according to any of (13) to (15), wherein the recording control unit performs control in a manner that, when the end timing has been received from the first information processing device, the second time-series data after the end timing is erased.

(18)

The information processing device according to any of (13) to (17), wherein the reception control unit controls reception of a command to end acquisition of the second time-series data from the first other information processing device, wherein the acquisition control unit performs control in a manner that acquisition of the second time-series data is ended in accordance with the command from the first other information processing device, and wherein the transmission control unit controls transmission of an end time of acquisition of the second time-series data based on the local time to the first other information processing device.

(19)

The information processing device according to any of (13) to (18), wherein the transmission control unit performs control in a manner that the first time-series data and the acquisition time of the first time-series data are transmitted at a predetermined interval.

(20)

The information processing device according to any of (13) to (19), wherein the first other information processing device is included in the second other information processing device.

(21)

The information processing device according to any of (13) to (20), wherein a type of the first time-series data and a type of the second time-series data coincide at least partly.

(22)

The information processing device according to any of (13) to (21), wherein the first time-series data includes video data, audio data, or data of a sensor provided in the other information processing device, and the second time-series data includes video data or audio data.

(23)

An information processing method including:

an acquisition control step of controlling acquisition of first time-series data and second time-series data through an information processing device;

a transmission control step of controlling transmission of the first time-series data and an acquisition time of the first time-series data based on local time, which is time in a device, to a first other information processing device through the information processing device;

a reception control step of receiving start timing, which is synchronized with timing at which recording of the second time-series data acquired by one or more second other information processing devices is started and is based on the local time, or end timing, which is synchronized with timing at which recording of the second time-series data acquired by the second other information processing devices is ended and is based on the local time, from the first other information processing device through the information processing device; and a recording control step of controlling start or end of recording of the second time-series data on the basis of the received start timing or end timing through the information processing device.

(24)

A program for causing a computer of an information processing device to execute processing including:

an acquisition control step of controlling acquisition of first time-series data and second time-series data;

a transmission control step of controlling transmission of the first time-series data and an acquisition time of the first time-series data based on local time, which is time in a device, to a first other information processing device;

a reception control step of receiving start timing, which is synchronized with timing at which recording of the second time-series data acquired by one or more second other information processing devices is started and is based on the local time, or end timing, which is synchronized with timing at which recording of the second time-series data acquired by the second other information processing devices is ended and is based on the local time, from the first other information processing device; and a recording control step of controlling start or end of recording of the second time-series data on the basis of the received start timing or end timing.

(25)

An information processing system including:

a first information processing device; and a plurality of second information processing devices, wherein the first information processing device includes a reception control unit configured to control reception of first time-series data acquired by the plurality of second information processing devices and acquisition times of the first time-series data based on local time, which is time in each of the second information processing devices, and a synchronization control unit configured to determine, on the basis of the first time-series data from the plurality of second information processing devices, start timing or end timing of recording of second time-series data acquired by the plurality of second information processing devices, and wherein each of the second information processing devices includes an acquisition control unit configured to control acquisition of the first time-series data and the second time-series data, a transmission control unit configured to control transmission of the first time-series data and an acquisition time of the first time-series data based on the local time to the first information processing device, and a recording control unit configured to control start or end of recording of the second time-series data on the basis of the start timing or end timing.

REFERENCE SIGNS LIST 1 shooting system
11-1 to 11-n camera
12 information processing terminal
104 image processing circuit
107 audio processing circuit
111 communication circuit
113 RAM
115 CPU
116 GPU
117 recording medium
151 reception control unit
152 shooting control unit
153 recording control unit
154 transmission control unit
201 input device
202 output device
203 CPU
204 GPU
205 communication device
221 correspondence detection program
222 synchronization control program
223 camera detection and communication program
224 UI program
251 reception control unit
252 correspondence detection unit
253 synchronization control unit
254 command unit
255 transmission control unit
301 shooting system
311 computer group
401 shooting system

The invention claimed is:

1. A first information processing device, comprising:
a reception control unit configured to control reception of first time-series data acquired by a plurality of second information processing devices and acquisition times of the first time-series data based on a local time for each of the second information processing devices; and
a synchronization control unit configured to determine, based on the first time-series data from the plurality of second information processing devices, one of start time or end time of recordation of second time-series data acquired by the plurality of second information processing devices.

2. The first information processing device according to claim 1,
wherein the synchronization control unit is further configured to:
determine, based on the first time-series data from the plurality of second information processing devices, one of the start time or the end time based on the local time for each of the second information processing devices; and
report the start time or the end time to each of the second information processing devices.

3. The first information processing device according to claim 1, further comprising a command unit configured to command the plurality of second information processing devices to start and end the acquisition of the second time-series data.

4. The first information processing device according to claim 3,
wherein the synchronization control unit is further configured to determine one of a latest time among times at which the plurality of second information processing devices have started the acquisition of the first time-series data or a first time after the latest time, as the start time of the recordation of the second time-series data.

5. The first information processing device according to claim 3,
wherein the reception control unit is further configured to control reception of end times of the acquisition of the second time-series data based on the local time of each of the second information processing devices, and
wherein the synchronization control unit is further configured to determine one of an earliest time among the end times of the plurality of second information processing devices or a first time before the earliest time, as the end time of the recordation of the second time-series data.

6. The first information processing device according to claim 1, further comprising
a correspondence detection unit configured to detect a difference in the local time of each of the second information processing devices based on synchronization of the first time-series data from the plurality of second information processing devices,
wherein the synchronization control unit is further configured to determine the start time or the end time based on the detected difference in the local time of each of the second information processing devices.

7. The first information processing device according to claim 6,
wherein the reception control unit is further configured to control the reception of the first time-series data and the acquisition times of the first time-series data transmitted from the plurality of information processing devices at a specific time interval, and
wherein the correspondence detection unit is further configured to synchronize the first time-series data from the plurality of second information processing devices in parallel with the reception of the first time-series data.

8. The first information processing device according to claim 1,
wherein a first type of the first time-series data at least partly coincides with a second type of the second time-series data.

9. The first information processing device according to claim 1,
wherein the first time-series data includes at least one of video data, audio data, or sensor data associated with a sensor of the plurality of second information processing devices, and the second time-series data includes at least one of the video data or the audio data.

10. An information processing method, comprising:
in a first information processing device:
controlling reception of first time-series data acquired by a plurality of second information processing devices and acquisition times of the first time-series data based on a local time for each of the second information processing devices; and
determining, based on the first time-series data from the plurality of second information processing devices, one of start time or end time of recordation of second time-series data acquired by the plurality of second information processing devices.

11. A non-transitory computer-readable medium having stored thereon computer-executable instructions, which when executed by a computer, cause a first information processing device to execute operations, the operations comprising:
controlling reception of first time-series data acquired by a plurality of second information processing devices and acquisition times of the first time-series data based on a local time for each of the second information processing devices; and
determining, based on the first time-series data from the plurality of second information processing devices, start time or end time of recordation of second time-series data acquired by the plurality of second information processing devices.

* * * * *